(12) United States Patent
Suzuki

(10) Patent No.: US 8,311,135 B2
(45) Date of Patent: Nov. 13, 2012

(54) WIRELESS COMMUNICATION APPARATUS

(75) Inventor: Kuniyuki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 950 days.

(21) Appl. No.: 12/298,138

(22) PCT Filed: Apr. 28, 2006

(86) PCT No.: PCT/JP2006/308963
§ 371 (c)(1),
(2), (4) Date: Oct. 23, 2008

(87) PCT Pub. No.: WO2007/125591
PCT Pub. Date: Nov. 8, 2007

(65) Prior Publication Data
US 2009/0202008 A1    Aug. 13, 2009

(51) Int. Cl.
*H04K 1/10* (2006.01)
(52) U.S. Cl. ........ 375/260; 375/219; 375/220; 375/267; 370/310; 370/204; 370/203; 370/465; 455/450; 455/561; 455/423
(58) Field of Classification Search ................ 375/260, 375/267, 219; 370/203, 204, 310; 455/450, 455/423
See application file for complete search history.

(56) References Cited

U.S. PATENT DOCUMENTS

| 7,257,423 B2 * | 8/2007 | Iochi ............................ 455/561 |
| 7,583,968 B2 * | 9/2009 | Kimura ........................ 455/450 |
| 7,916,775 B2 * | 3/2011 | Kim et al. ..................... 375/220 |
| 8,130,819 B2 * | 3/2012 | Kim et al. ..................... 375/220 |
| 2005/0227645 A1 | 10/2005 | Sudo |
| 2006/0062140 A1 | 3/2006 | Sudo |
| 2008/0279089 A1 * | 11/2008 | Rosenhouse et al. ......... 370/203 |
| 2008/0298224 A1 * | 12/2008 | Pi et al. .......................... 370/204 |
| 2010/0027595 A1 * | 2/2010 | Takada et al. ................. 375/219 |
| 2010/0097967 A1 * | 4/2010 | Kwon et al. ................... 370/310 |
| 2011/0081902 A1 * | 4/2011 | Seo et al. ...................... 455/423 |
| 2011/0243265 A1 * | 10/2011 | Dateki et al. .................. 375/260 |

FOREIGN PATENT DOCUMENTS

| JP | 9 284245 | 10/1997 |
| JP | 11 239118 | 8/1999 |
| JP | 2002 353944 | 12/2002 |
| JP | 2004 159248 | 6/2004 |
| JP | 2004 172721 | 6/2004 |
| JP | 2004 222171 | 8/2004 |
| JP | 2005 117579 | 4/2005 |
| JP | 2005 204254 | 7/2005 |
| JP | 2006 50545 | 2/2006 |
| JP | 2006 515141 | 5/2006 |

OTHER PUBLICATIONS

"3rd Generation Partnership Project; Technical Specification Group Radio Access Network; Physical Layer Aspects for Evolved UTRA (Release 7)", 3GPP TR 25.814, V1.0.3, pp. 45-51, (2006).

(Continued)

*Primary Examiner* — Eva Puente
(74) *Attorney, Agent, or Firm* — Oblon, Spivak, McClelland, Maier & Neustadt, L.L.P.

(57) ABSTRACT

A wireless communication device including a sending data amount determination unit, a data sending unit, a monitor function unit, a transmission control data producing unit, a transmission control data sending unit, a data reception unit, and an application I/F (interface) unit. The transmission control data sending unit includes a transmission control data separation unit, a transmission control data replication unit, and a data mapping unit.

10 Claims, 25 Drawing Sheets

OTHER PUBLICATIONS

"3rd Generation Partnership Project; Technical Specification Group Radio Access Network; Physical layer procedures (FDD) (Release 6)", 3GPP TS 25.214, V6.7.1, pp. 34-35, 2005).

Office Action issued Dec. 16, 2010, in Japan Patent Application No. 2008-513038 (with English translation).

NTT DoCoMo, et al., "L1/L2 Control Channel Structure for E-UTRA Downlink", 3GPP TSG-RAN WG1 LTE Ad Hoc Meeting, R1-060032, Jan. 25, 2006, pp. 1-9.

NTT DoCoMo, et al., "L1/L2 Control Channel Structure for E-UTRA Uplink", 3GPP TSG-RAN WG1 Metting #44, R1-060320, Feb. 17, 2006, pp. 1-7.

Extended European Search Report issued Dec. 29, 2011, in Patent Application No. 06732466.5.

"Mapping position of control channel for Uplink SC-FDMA", PANASONIC, TSG-RAN WG1#43, R1-051395, http://www.3gpp.org/ftp/tsg_ran/WG1_RL1/TSGR1_43/Docs/R1-051395.zip, XP 2450961, Nov. 11, 2005, pp. 1-6.

"L1/L2 Control Channel Structure for E-UTRA Uplink", NTT DoCoMo, et al., 3GPP TSG-RAN WG1 Meeting #44bls, R1-060785, XP 50101700, Mar. 27-31, 2006, pp. 1-7.

* cited by examiner

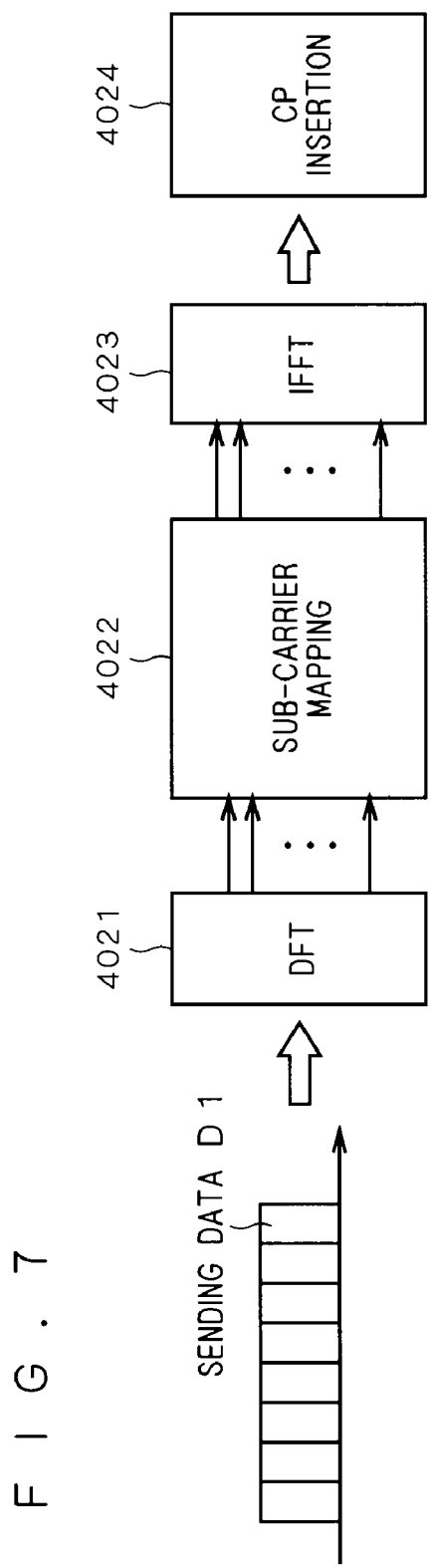
F I G. 7

WIRELESS COMMUNICATION APPARATUS

TECHNICAL FIELD

The present invention relates to a wireless communication device, and particularly to a wireless communication device used in mobile communication.

BACKGROUND ART

A method for appropriately changing resources such as a frequency and a time (time slot) in minimum units of sending data is adopted in a wireless communication device in which a communication method based on OFDM (Orthogonal Frequency Division Multiplexing) is used.

In this instance, it is necessary that a transmission control channel is processed before detailed channel decoding (determination of a position at which data is extracted from a physical channel→decoding processing such as deinterleaving and rate dematching→error correction processing→CRC (Cyclic Redundancy Check)) in a reception-side device. Therefore, irrespective of the wireless resources such as a frequency bandwidth used and the number of time slots used, unfortunately processing becomes complicated such that a plurality of pieces of channel decoding are required unless the same wireless format is prepared. Additionally, in any wireless resource such as a frequency bandwidth used and the number of time slots used, when the completely same transmission control data is sent at the same wireless sending bit, there is generated a problem in that transmission characteristics are not improved although the frequency bandwidth is widened, and the time slot is expanded.

In 3GPP (3rd Generation Partnership Project) which is of a standardization project of a third generation mobile communication system, there is reported a transmission control channel necessary for communication of the reception-side device in upstream communication (communication from a mobile device to a base station), and Non-Patent Document 1 discloses contents of the report.

When a sending-side device does not perform sending for a certain period or more, known series information is lost in the reception-side device, which causes a problem in that data cannot correctly be received from the sending-side device.

Non-Patent Document 1: 3GPP TS25.814 V1.0.3 (2006-2), Physical Layer Aspects for Evolved UTRA, pp. 45-51.

DISCLOSURE OF THE INVENTION

The present invention has been made in order to solve the above problems, and a first object of the present invention is to provide a wireless communication device, wherein transmission characteristics are improved while a reception-side wireless communication device can easily perform demodulation in the wireless communication device in which the wireless communication method for appropriately changing the wireless resources such as the frequency bandwidth used and the number of time slots used in minimum units of the sending data is adopted.

A second object of the present invention is to provide a wireless communication device in which the reception-side wireless communication device enables smooth reception even if the sending-side wireless communication device resumes the communication after not performing the sending for a certain period or more.

In accordance with a first aspect of the present invention, a wireless communication device in which sending data and transmission control data are sent and received in resource block units, the transmission control data including resource dependent data and resource independent data except for the resource dependent data, the resource dependent data being imparted according to the number of resource blocks sent in each the resource block, the resource dependent data depending on a sending resource, the wireless communication device includes a transmission control data separation unit which receives the transmission control data to separate the transmission control data into the resource dependent data and the resource independent data; a transmission control data replication unit which has at least a function of receiving the resource independent data to replicate the resource independent data according to the number of resource blocks; a transmission control data mapping unit which receives the resource dependent data and the resource independent data including a replica and performs mapping such that the resource independent data and the resource dependent data are included in the resource block.

In accordance with a second aspect of the present invention, a wireless communication device in which sending data and transmission control data are sent and received in resource block units, the transmission control data including resource dependent data and resource independent data except for the resource dependent data, the resource dependent data being imparted according to the number of resource blocks sent in each the resource block, the resource dependent data depending on a sending resource, the wireless communication device includes a transmission control data separation unit which receives the transmission control data to separate the transmission control data into the resource dependent data and the resource independent data; an error correction unit which receives the separated resource dependent data and the separated resource independent data and performs error correction coding processing to the resource dependent data and the resource independent data to produce error-correction-coded resource dependent data and error-correction-coded resource independent data; a puncture unit which receives the error-correction-coded resource dependent data and the error-correction-coded resource independent data and performs puncture processing to an excess bit to produce punctured resource independent data, the excess bit exceeding a data amount sendable by the resource block in error-correction-coded resource independent data; and a transmission control data mapping unit which receives the error-correction-coded resource dependent data and the punctured resource independent data and performs mapping such that the error-correction-coded resource dependent data and the punctured resource independent data are included in the resource block.

In accordance with a third aspect of the invention, a wireless communication device in which sending data and transmission control data are sent and received in resource block units, the wireless communication device includes a sending time interval measuring unit which measures a sending interval of the sending data; and a sending data mapping unit which maps the sending data in a regulation wireless format, wherein the sending data mapping unit has a function of determining whether or not a known series is required based on measurement result of the sending interval, the known series being formed by know data for a reception-side wireless communication device separately from the sending data and the transmission control data.

According to the first aspect of the wireless communication device of the present invention, in the transmission control data mapping unit, because the mapping is performed such that the resource independent data and the resource dependent data are included in the resource block, any transmitted resource block becomes the same transmission control data format. Therefore, in a reception processing unit of the base station which is of a recipient, the same processing can be performed every time to easily perform demodulation, and hardware can be easily implemented to obtain a high-speed, stable, inexpensive wireless communication device.

According to the second aspect of the wireless communication device of the invention, even if the error correction coding is performed, because the excess bit is deleted in the puncture unit to prevent the resource block from generating a bias of the data amount, any transmitted resource block becomes the same transmission control data format. Therefore, in the reception processing unit of the base station which is of a recipient, the same processing as that of the maximum usable case can always be performed irrespective of the number of resource blocks used, the demodulation can easily be performed, and the hardware can be easily implemented to obtain a high-speed, stable, inexpensive wireless communication device.

According to the second aspect of the wireless communication device of the present invention, the sending data mapping unit has the function of determining whether or not the known series is required based on the measurement result of the sending interval, and the known series is formed by know data for the reception-side wireless communication device separately from the sending data and the transmission control data. Therefore, in the case where the sending is resumed from the state where the sending is not performed for a while to the opposite wireless communication device, the reception-side device can perform the reception with stable reception characteristics by sending the known series, and a balance between stabilization of the reception characteristics and a transmission speed of the substantial sending data can be achieved.

Objects, features, aspects, and advantages of the invention will become more apparent from the following detailed description and accompanying drawings.

BRIEF DESCRIPTION OF THE DRAWINGS

FIG. 7 is a block diagram showing a configuration of a portion associated with SC-FDMA of a sending unit.

BEST MODE FOR CARRYING OUT THE INVENTION (A. First Embodiment)

(A-1. Configuration of Mobile Communication System)

Figure 1:
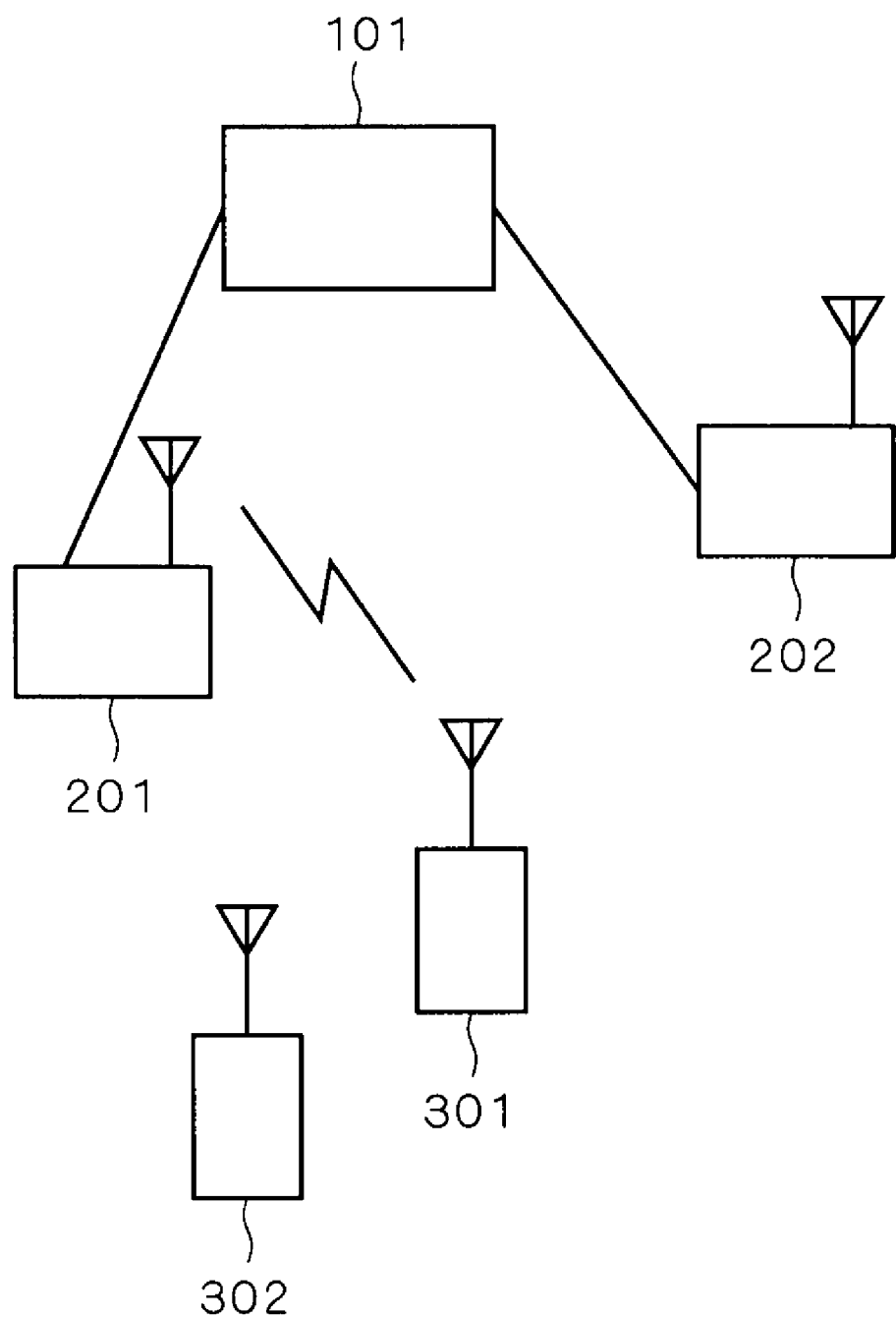
FIG. 1 is a conceptual view explaining a configuration of a mobile communication system.

FIG. 1 is a conceptual view explaining a configuration of a general mobile communication system. In FIG. 1, a base station higher-level device 101 is connected to base stations 201 and 202 through a communication line such as ATM (Asynchronous Transfer Mode) and an IP (Internet Protocol) network, and the base station higher-level device 101 performs processing such as a gateway function with a public telephone line network and resource management across the base stations.

In the base stations 201 and 202, the mobile devices 301 and 302 and OFDMA (Orthogonal Frequency Division Multiple Access) are utilized in downstream communication (communication from the base station to the mobile device), and the mobile devices 301 and 302 and SC-FDMA (Single Carrier Frequency Division Multiple Access) are utilized in upstream communication (communication from the mobile device to the base station).

(A-2. Configuration of Wireless Communication Device)

Figure 2:
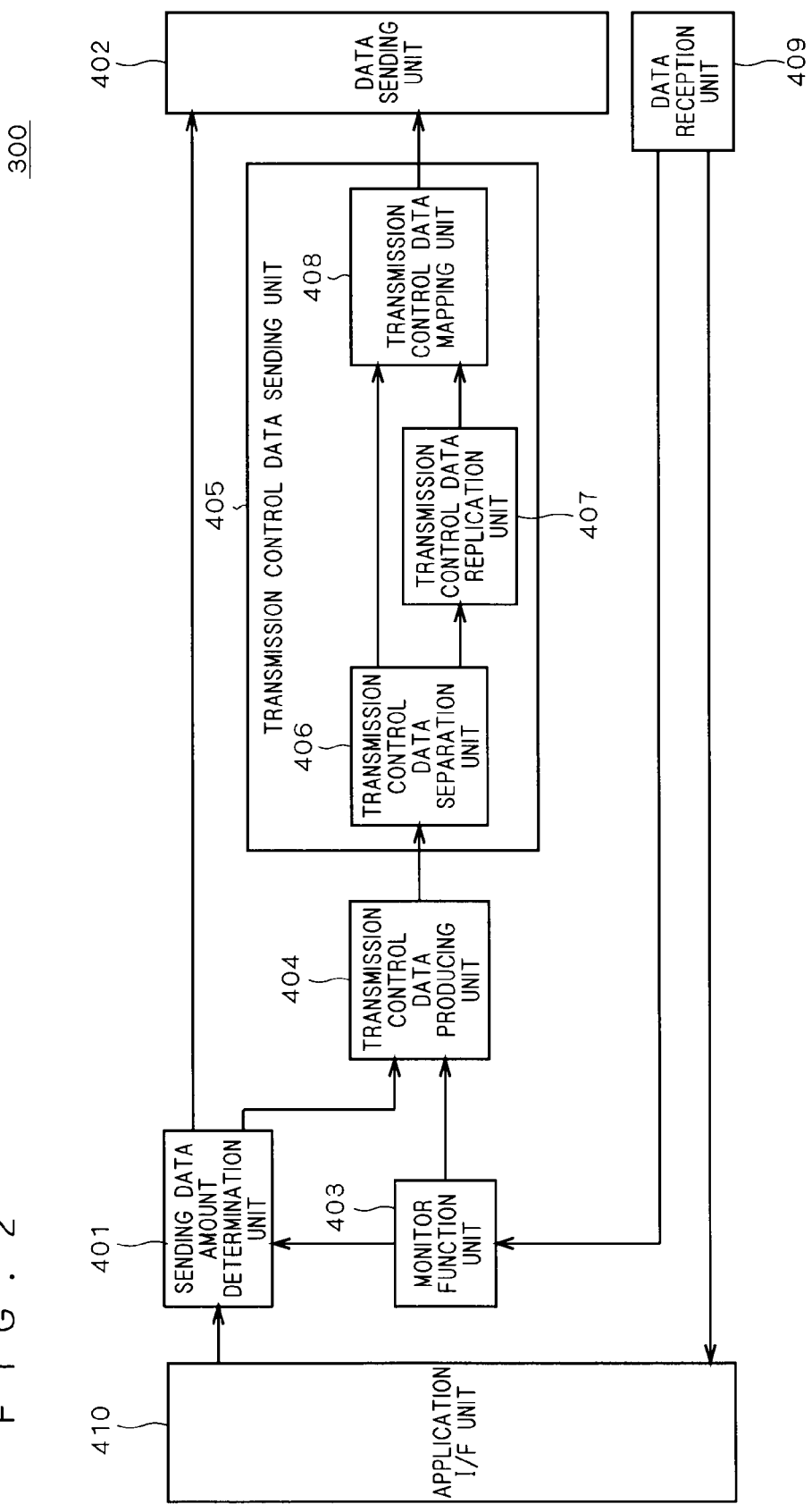
FIG. 2 is a block diagram showing a configuration of a wireless communication device according to a first embodiment of the present invention.

FIG. 2 is a block diagram showing a configuration of a data sending unit of a wireless communication device 300 constituting the base station and mobile device in a wireless communication device according to a first embodiment of the invention. Because the base station and the mobile device basically have the same function, only the mobile device is described below.

The wireless communication device 300 of FIG. 2 includes a sending data amount determination unit 401, a data sending unit 402, a monitor function unit 403, a transmission control data producing unit 404, a transmission control data sending unit 405, a data reception unit 409, and an application I/F (interface) unit 410. The transmission control data sending unit 405 includes a transmission control data separation unit 406, a transmission control data replication unit 407, and a data mapping unit 408.

The application I/F (interface) unit 410 has a function of supplying sending data, generated by an application loaded in the mobile device, to the sending data amount determination unit 401.

The sending data amount determination unit 401 determines what time, which frequency, and how much data is sent to which antenna, when a plurality of sending antennas are provided, based on input data supplied from monitor function unit 403 which monitors the data reception unit 409 and input data supplied from the application I/F unit 410.

The sending data amount determination unit 401 supplies pieces of data such as a time at which the sending is determined, a frequency, an antenna, and a data amount (amount of data for making a request of sending permission to the base station) to the transmission control data producing unit 404, while the sending data amount determination unit 401 sends the determined sending data to the data sending unit 402.

The transmission control data producing unit 404 transforms the pieces of data such as the time at which the sending is determined, the frequency, the antenna, and the data amount into a regulation bit format in which the base station receives the pieces of data, and the transmission control data producing unit 404 supplies the transformed pieces of data as transmission control data to the transmission control data sending unit 405.

The transmission control data sending unit 405 transforms the supplied transmission control data into a predetermined wireless format to supply the transformed transmission control data to the data sending unit 402.

The data sending unit 402 performs multi-level modulation processing, SC-FDMA modulation processing, up-convert, and processing for amplifying an electric power to a required sending electric power value to the transmission control data transformed into the wireless format, and the data sending unit 402 performs the sending through an antenna (not shown).

The monitor function unit 403 extracts the sending permission data from the base station in signal supplied from the data reception unit 409. For example, in a system to which ARQ (Automatic Repeat Request) is applied, the monitor function unit 403 extracts ACK/NACK (confirmation answer/negative answer) data from the base station. Additionally, the monitor function unit 403 can also have a function of extracting the frequency of the sending permission data and a data sending amount of the sending permission data along with the sending permission data.

The monitor function unit 403 also has a function of producing measurement data sent to the base station for the purpose of the downstream communication.

For example, in order to perform sending diversity or MIMO (Multiple Input Multiple Output), a reception transmission channel is estimated in the plurality of antennas provided in the base station which conducts the download communication.

For example, SINR (Signal to Interference and Noise Ratio) or CINR (Carrier to Interference and Noise Ratio) is computed using known series signals such as Pilot.

For example, in order to perform input to a functional unit (so-called scheduler) which determines the sending data amount of the base station conducting the downstream communication, substantial quality margin data (CQI: Channel Quality Indicator) including a receivable buffer amount is effectively formed by clearly expressing the downstream-communicable data amount, the modulation method, and the number of simultaneously usable resources.

The definition of CQI is described in 3GPP TS25.214 V6.7.1 (2005-12), Physical layer procedures (FDD), pp. 34-35.

Desirably, in addition to the sending data, QoS data (such as allowable delay time and data transmission speed to be guaranteed) corresponding to the sending media data is imparted to the input data supplied from the application I/F unit 410 to the sending data amount determination unit 401.

The sending data amount determination unit 401 performs processing for reducing a delay time according to the QoS data even if the data amount for making the request to the base station is decreased. A description of a technique for reducing the delay time is omitted because the technique has a low relation to the present invention.

(A-3. Configuration and Operation of Transmission Control Data Sending Unit)

In the wireless communication device 300, the transmission control data sending unit 405 has the feature of the present invention. Therefore, a configuration and an operation of the transmission control data sending unit 405 will be described in detail below.

The data supplied from the transmission control data producing unit 404 to the transmission control data sending unit 405 includes various pieces of data such as the time at which the sending is determined, the frequency, the antenna, and the data amount, and the pieces of data are first supplied to the transmission control data separation unit 406.

The transmission control data separation unit 406 separates the pieces of data into two. One of the divided pieces of data is data (resource dependent data) dependent on transmission resource. The resource dependent data includes quality data such as data (frequency f of FDMA or OFDMA) relating to the frequency, data (time t of TDMA (Time Division Multiple Access)) relating to the time slot, and data (space S of SDMA (Spatial Division Multiple Access)) relating to each space of MIMO.

In addition, in the case of MIMO (SDMA), sometimes the quality data of the antenna is sent and received in each antenna.

More specifically, the resource dependent data includes reception and transmission channel estimation data at the plurality of antennas provided in the base station which conducts the downstream communication to perform the sending diversity or MIMO, data of SINR or CINR in which a known series signal such as Pilot is used, or downstream-communicable quality margin data (CQI) fed into the scheduler determining the sending data amount of the base station which conducts the downstream communication.

The other is data (resource independent data) except for the data dependent on the transmission resource. Examples of the resource independent data include information on a kind of multiplexed data called TFCI (Transport Format Combination Indicator), information which becomes an index of the data amount, and data of ACK/NACK.

The resource dependent data separated by the transmission control data separation unit 406 is directly supplied to the transmission control data mapping unit 408, and the resource independent data is supplied to the transmission control data replication unit 407.

The data replication unit 407 replicates the number of transmitted resource blocks for the supplied resource independent data, and the data replication unit 407 supplies the resource blocks to the transmission control data mapping unit 408.

As used herein, the resource block shall mean a minimum sending unit, which is formed by frequency-dividing a frequency band usable for the communication and allocated for the sending of the mobile device, or an integral multiple of the minimum sending unit allocated for the sending of the mobile device. In the following description, the resource block is dealt with as an object in which a plurality of sub-carriers (carrier wave) having different frequencies are continuously gathered. Alternatively, the resource block may be formed into an object in which a plurality of sub-carriers having different frequencies are discontinuously gathered.

The transmission control data mapping unit 408 receives the resource dependent data supplied from the transmission control data separation unit 406 and the resource independent data (including the replicated data) supplied from the data replication unit 407, and the transmission control data mapping unit 408 maps the pieces of transmission control data in the wireless format.

An example of the processing performed by the transmission control data sending unit 405 will schematically be described with reference to FIGS. 2 and 3 to 5. In the following description, it is assumed that the number of sending resource blocks is two.

Figure 3:
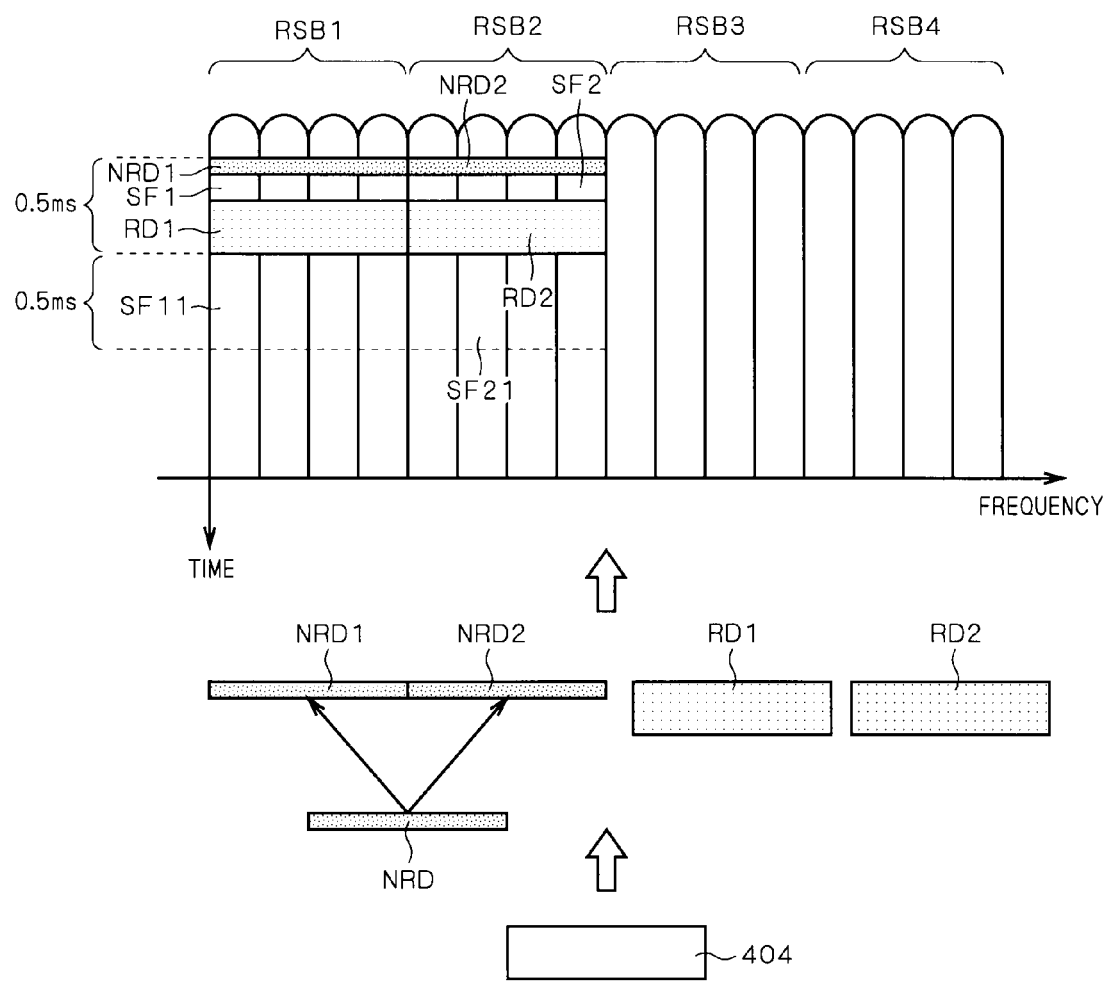
FIG. 3 is a view showing an example of transmission control data mapping.
Figure 4:
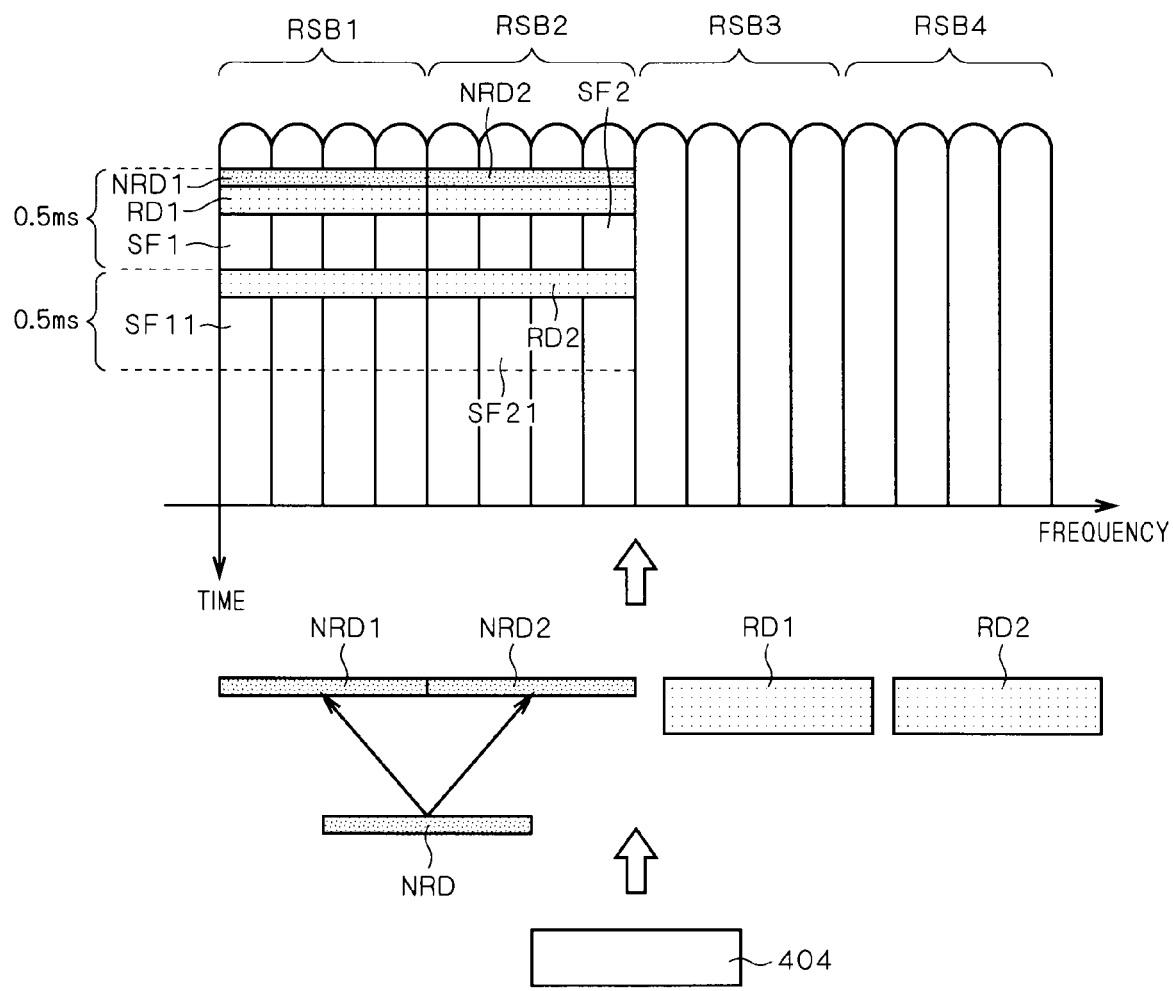
FIG. 4 is a view showing an example of transmission control data mapping.
Figure 5:
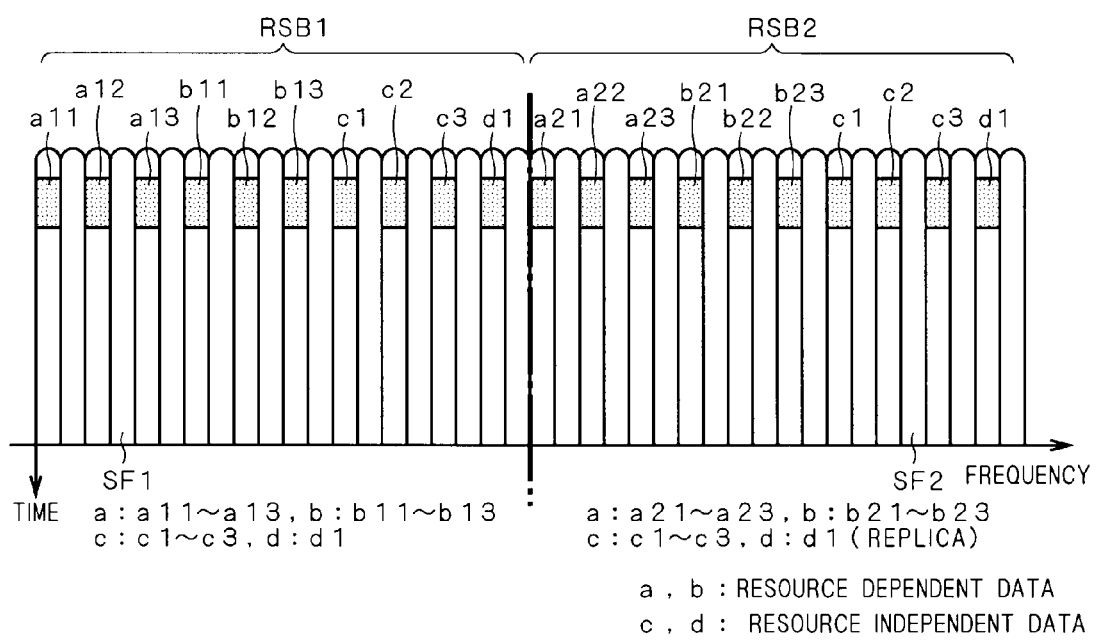
FIG. 5 is a view showing an example of transmission control data mapping.

FIG. 3 shows an example in which transmission control data temporally occupies part of one sub-frame. As used herein, the sub-frame shall mean a time unit during which a block of pieces of sending data in a layer 1 (physical layer) is sent. In FIGS. 3 to 5, one sub-frame is set at 0.5 ms by way of example. In FIGS. 3 to 5, the time advances toward the downward direction. Each resource block includes the plurality of sub-carriers having different frequencies, and the frequency of the sub-carrier is increased toward the right in FIGS. 3 to 5.

As shown in FIG. 3, the transmission control data separation unit 406 (FIG. 2) separates the transmission control data supplied from the transmission control data producing unit 404 (FIG. 2) into resource independent data NRD and pieces of resource dependent data RD1 and RD2. At this point, because the pieces of resource dependent data RD1 and RD2 are provided for each resource block according to the number of transmission resource blocks, the pieces of resource dependent data RD1 and RD2 are separated according to each resource block.

The data replication unit 407 (FIG. 2) replicates the two pieces of supplied resource independent data NRD according to the two transmission resource blocks which is of the number of resource blocks to form pieces of resource independent data NRD1 and NRD2.

The transmission control data mapping unit 408 (FIG. 2) maps the pieces of resource independent data NRD1 and NRD2 and the pieces of resource dependent data RD1 and RD2 in a predetermined sub-frame of a predetermined (frequency) resource block.

FIG. 3 shows an example in which the mapping is performed to resource blocks RSB1 and RSB2 in resource blocks RSB1, RSB2, RSB3, and RSB4. In FIG. 3, the resource independent data NRD1 and the resource dependent data RD1 are mapped across all the sub-carriers in a sub-frame SF1 of the resource block RSB1, and the resource independent data NRD2 and the resource dependent data RD2 are mapped across all the sub-carriers in a sub-frame SF2 of the resource block RSB2.

Therefore, the sub-carrier of the resource block can effectively be utilized. Herein, the sub-frames SF1 and SF2 are sub-frame in the same time slot.

FIG. 4 shows an example in which transmission control data temporally occupies part of a plurality of sub-frames.

As shown in FIG. 4, the transmission control data mapping unit 408 (FIG. 2) maps the pieces of resource independent data NRD1 and NRD2 and the pieces of resource dependent data RD1 and RD2 in a predetermined sub-frame of a predetermined (frequency) resource block.

FIG. 4 shows an example in which the mapping is performed to the resource blocks RSB1 and RSB2 in the resource blocks RSB1, RSB2, RSB3, and RSB4. In FIG. 4, the whole of the resource independent data NRD1 and part of the resource dependent data RD1 are mapped across all the sub-carriers in the sub-frame SF1 of the resource block RSB1, and the rest of the resource independent data RD1 is mapped across all the sub-carriers in a sub-frame SF11 of the resource block RSB1.

The whole of the resource independent data NRD2 and part of the resource dependent data RD2 are mapped across all the sub-carriers in the sub-frame SF2 of the resource block RSB2, and the rest of the resource independent data RD2 is mapped across all the sub-carriers in a sub-frame SF21 of the resource block RSB2.

The sub-frames SF1 and SF2 are sub-frames in the same time slot, and the sub-frames SF11 and SF21 are sub-frames in the same time slot subsequent to the time slots of the sub-frames SF1 and SF2.

Thus, the pieces of resource dependent data RD1 and RD2 are separated into two and mapped in different sub-frames respectively, so that the transmission control data can meet the large amounts of bits of the pieces of resource dependent data RD1 and RD2.

In the examples of FIGS. 3 and 4, the transmission control data temporally occupies part of one or the plurality of sub-frames. It is also considered that the transmission control data temporally occupies the whole of one or the plurality of sub-frames.

In the examples of FIGS. 3 and 4, the transmission control data is mapped across all the sub-carriers in the resource block. Alternatively, as shown in FIG. 5, the transmission control data may be mapped in part of the plurality of sub-carriers constituting the resource block. This enables variations of the mapping to be increased.

In the description of FIG. 5, it is assumed that a, b, c, and d are the pieces of transmission control data, a and b are the pieces of resource dependent data, and c and d are the pieces of resource independent data. More particularly, it is assumed that a is CQI, b is SIR, c is TFCI, and d is ACK/NACK. The pieces of resource dependent data a and b which are of data averaged in the resource in each transmission resource are fed into the transmission control data sending unit 405.

As shown in FIG. 5, assuming that a11, a12, a13, a21, a22, a23, b11, b12, b13, b21, b22, b23, c1, c2, c3, and d1 are the pieces of transmission control data to which the transmission control data producing unit 404 (FIG. 2) performs predetermined coding to the transmission control data, the transmission control data separation unit 406 (FIG. 2) into which the pieces of transmission control data are fed separates the pieces of transmission control data into the pieces of resource dependent data a11 to a13 and b11 to b13 mapped in the resource block RSB1, the pieces of resource dependent data a21 to a23 and b21 to b23 mapped in the resource block RSB2, and the pieces of resource independent data c1, c2, c3, and d1.

The pieces of resource independent data c1 to c3 and d1 are supplied to the data replication unit 407 (FIG. 2), and the pieces of resource dependent data are supplied to the transmission control data mapping unit 408 (FIG. 2).

The data replication unit 407 (FIG. 2) replicates the pieces of supplied resource independent data c1 to cc3 and d1 according to the two transmission resource blocks which is of the number of resource blocks.

The transmission control data mapping unit 408 (FIG. 2) maps the pieces of resource independent data c1 to c3 and d1 and the pieces of resource dependent data a11 to a13, a21 to a23, b11 to b13, and b21 to b23 in a predetermined sub-frame of a predetermined (frequency) resource block.

FIG. 5 shows an example in which the mapping is performed in the resource blocks RSB1 and RSB2. In FIG. 5, the pieces of resource dependent data a11 to a13 and b11 to b13 and the pieces of resource independent data c1 to c3 and d1 are mapped in the sub-frame SF1 of the resource block RSB1 such that each piece of the pieces of data occupies one sub-carrier, and the pieces of resource dependent data a21 to a23 and b21 to b23 and the pieces of resource independent data c1 to c3 and d1 are mapped in the sub-frame SF2 of the resource block RSB2 such that each piece of data occupies one sub-carrier. Alternatively, the resource dependent data and the resource independent data may be mapped in one sub-carrier so as to be mixed together.

Herein, the sub-frames SF1 and SF2 are sub-frame in the same time slot, and the sub-carrier occupied by each of the resource dependent data and the resource independent data (including replica) is in the same time slot.

The pieces of resource dependent data a11 to a13 and b11 to b13 and the resource independent data c1 to c3 and d1 are sequentially mapped, the resource dependent data a11 is mapped in the sub-carrier having the lowest frequency, and the resource independent data d1 is mapped in the sub-carrier having the highest frequency. The pieces of resource dependent data a21 to a23 and b21 to b23 and the resource independent data c1 to c3 and d1 are sequentially mapped, the resource dependent data a21 is mapped in the sub-carrier having the lowest frequency, and the resource independent data d1 is mapped in the sub-carrier having the highest frequency.

(A-4. Effect)

As described above, in the transmission control data sending unit 405 of the wireless communication device 300 of the first embodiment, in the case where the resource block possibly generates the bias in the data amount because of a small amount of resource transmitted from the data sending unit 402, part of the transmission control data is replicated by the transmission control data sending unit 405, and the replicated transmission control data is mapped such that any transmission resource block becomes the same transmission control data format.

Therefore, in the reception processing unit of the base station which is of the recipient, the same processing can be performed every time to easily perform demodulation, and the hardware can be easily implemented to obtain the high-speed, stable, inexpensive wireless communication device.

The data dependent on the transmission resource is transmitted by the resource, so that a resource index (indicator) is eliminated to reduce the transmission data amount.

(A-5. First Modification)

Thus, some examples of the transmission control data mapping in the transmission control data mapping unit 408 are described in the above-described first embodiment. The following mapping can also be performed.

Figure 6:
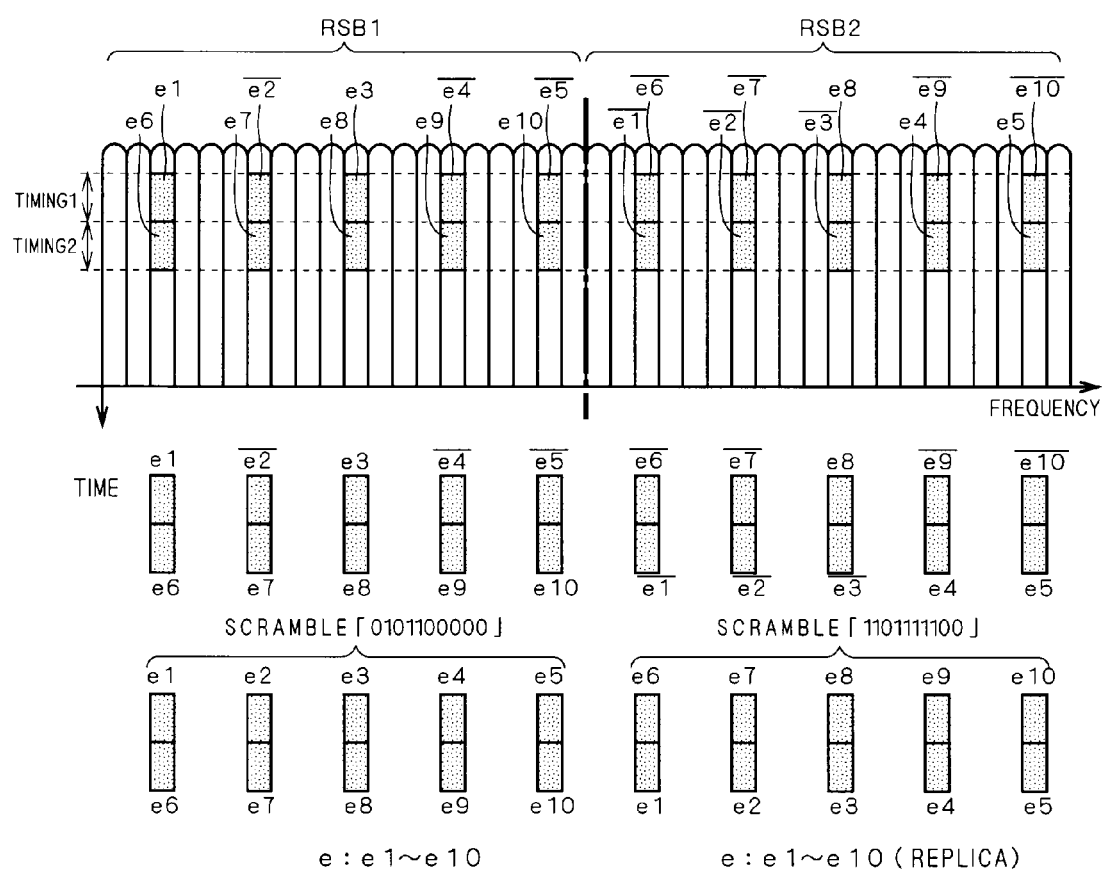
FIG. 6 is a view showing an example of transmission control data mapping.

That is, as shown in FIG. 6, the mapping is performed in the sub-frame of the resource block while the timing is further divided, and different scramble (data modulation) processing may be performed to the transmission control data in each resource block.

For the purpose of simple explanation, in FIG. 6, the transmission control data is limited to data (resource independent data) e except for the data dependent on the transmission resource.

As shown in FIG. 6, assuming that e1, e2, e3, e4, e5, e6, e7, e8, e9, and e10 are pieces of transmission control data to which the transmission control data producing unit 404 (FIG. 2) performs predetermined coding, the pieces of transmission control data e1 to e10 are fed into the transmission control data separation unit 406 (FIG. 2), and the transmission control data separation unit 406 supplies the pieces of transmission control data e1 to e10 to data replication unit 407 (FIG. 2) while separating the pieces of transmission control data e1 to e10 from the resource dependent data (not shown).

The data replication unit 407 (FIG. 2) replicates the supplied resource independent data e1 to e10 according to the two transmission resource blocks which is of the number of resource blocks.

As shown in FIG. 6, the pieces of resource independent data e1 to e10 are allocated to each of the resource blocks RSB1 and RSB2 so as to be divided into two different time slots, and the resource blocks RSB1 and RSB2 differ from each other in the allocation.

That is, in the resource block RSB1, although the pieces of resource independent data e1 to e10 are sequentially allocated in the ascending order of the frequency of the sub-carrier, all the pieces of resource independent data e1 to e10 cannot be allocated in the same time slot (timing). Therefore, the pieces of resource independent data e1 to e5 are allocated at timing 1, and the pieces of resource independent data e6 to e10 are allocated at timing 2.

In the resource block RSB2, the pieces of resource independent data e6 to e10 are sequentially allocated in the ascending order of the frequency of the sub-carrier at timing 1, and the pieces of resource independent data e1 to e5 are sequentially allocated in the ascending order of the frequency of the sub-carrier at timing 2.

Therefore, the allocation of the plurality of same pieces of data at the same time slot can be prevented in all the resource blocks. In FIG. 6, the pieces of resource independent data e6 to e10 are allocated in the resource block RSB2 at the time slot during which the pieces of resource independent data e1 to e5 are allocated in the resource block RSB1. In the case where the wireless communication device is used in the good propagation environment, the wireless communication device can make the transition to the data reception processing at the timing 1, becoming the system in which the simple mobile device is permissible.

In the resource block RSB1 and the resource block RSB2, the same pieces of data are allocated in the sub-carriers which are away from each other at a maximum in terms of frequency. In the example of FIG. 6, 19 sub-carriers exist between the resource independent data e1 of the resource block RSB1 and the resource independent data e1 of the resource block RSB2. The same holds true for the pieces of resource independent data e2 to e10.

This is because of the following reason. In the case of frequency-selective fading peculiar to the mobile device, it is known that the characteristics are improved on the reception side when the same pieces of information are sent at frequencies away from each other at a maximum rather than the sending of the same pieces of information are sent at frequencies close to each other. Therefore, pieces of particular bit information are prevented from being brought close to each other on a frequency axis, and the reception characteristics can be improved.

After the allocation processing, the transmission control data mapping unit 408 performs scrambling processing to the allocation data (meaning the resource independent data to which the allocation processing is already performed) prior to the mapping in the resource block.

The data independent of the transmission resource becomes easily such extreme data that the same value is maintained for a long time (for example, in the case where the same data amount is continued), all the bits of the data value become "0" (for example, all the bits become "0" in the case of the absence of the sending data), or all the bits become "1".

For OFDM, PAPR (Peak-to-Average Power Ratio: a ratio of a peak electric power to an average electric power) becomes the maximum in the case where all the bits become "1" or "0", and PAPR becomes the second maximum in the case where a sign of only particular one bit is reversed.

Accordingly, during SC-FDMA, it is found that PAPR tend to be increased in the case where result of DFT (Discrete Fourier Transformation) concentrates on a particular frequency. Therefore, different pieces of scrambling are effectively performed in the resource block RSB1 and resource block RSB2.

When a scrambling code which is not biased toward a particular frequency component, that is, a scrambling code having good frequency characteristics is multiplied by fixed data having all the bits of "0", the product becomes equal to the frequency characteristics of the scrambling code, so that the data which is not biased toward the particular frequency component can be obtained. PAPR is lowered in the signal obtained by the data which is not biased toward the particular frequency component.

However, when the same scrambling code is used in the different resource block, because the same pattern is repeated, the frequency component corresponding to an interval between the scrambling codes becomes conspicuous. Therefore, the different scrambling codes are effectively used in the resource blocks respectively.

For example, in FIG. 6, the scramble of "0101100000" is applied to the allocation data for the resource block RSB1, and the scrambling code of "1101111100" is applied to the allocation data for the resource block RSB2.

The scrambling code is applied such that the data of the highest-level bit of the scrambling code is applied to the data which is allocated to the sub-carrier having the lowest frequency and earliest timing in the pieces of allocation data of each resource block. Then, the pieces of scramble data are sequentially applied at the same timing, the scramble data is applied to the data allocated to the sub-carrier having the lowest frequency in the resource block, and the scramble data is applied to the data allocated to the sub-carrier having the lowest frequency at the next timing.

Accordingly, for example, in the resource block RSB1, the scramble data "1" is applied to the pieces of allocation data e2, e4, and e5, and the scramble data "0" is applied to the remaining pieces of allocation data. The signs of the pieces of allocation data e2, e4, and e5 to which the scramble data "1" is applied are reversed, and the pieces of allocation data e2, e4, and e5 become pieces of allocation data /e2, /e4, and /e5.

On the other hand, in the resource block RSB2, the scramble data "1" is applied to the pieces of allocated data e6, e7, e9, e10, e1, e2, and e3, the signs of the pieces of allocated data e6, e7, e9, e10, e1, e2, and e3 are reversed, and pieces of allocation data /e6, /e7, /e9, /e10, /e1, /e2, and /e3 are obtained. The scramble data "0" is applied to the remaining pieces of allocated data.

Thus, after the different pieces of scrambling are performed to the resource blocks respectively, the transmission control data mapping unit 408 (FIG. 2) performs the mapping to a predetermined resource block.

SC-FDMA in the data sending unit 402 will be described below with a specific example. First a schematic operation of SC-FDMA will be described with reference to FIG. 7 showing a configuration of a portion associated with SC-FDMA of the data sending unit 402.

As shown in FIG. 7, sending data D1 of SC-FDMA is fed into a DFT processing unit 4021 to perform DFT processing. The output of the DFT processing unit 4021 is supplied to a sub-carrier mapping unit 4022, and an IFFT (Inverse Fast Fourier Transformation) unit 4023 performs OFDM processing. Finally, a CP (Cyclic Prefix) insertion unit 4024 performs processing for finally sending part of a front-end portion of the OFDM-processed signal again, and the transmission of the sending data D1 is ended.

At this point, in the case where the same pieces of data are fed into the DFT processing unit 4021 at equal intervals on the frequency axis, many frequency components are included at equal intervals. That is, the output of the DFT processing unit 4021 has an anomalous large amplitude and other minute amplitudes on the frequency axis.

For example, in the case of biased data where the transmission data except for the transmission control data does not exist while the transmission control data has all the bits of "0" or "1" or the repetition of all the bits of "01", a particular frequency component becomes conspicuous and a small number of other frequency components exists in the output of the DFT processing unit 4021.

The output of the DFT processing unit 4021 is supplied to the sub-carrier mapping unit 4022, and the IFFT (Inverse Fast Fourier Transformation) unit 4023 performs the OFDM processing, thereby obtaining a large PAPR in the output of the IFFT unit 4023. When PAPR becomes large, the bias is generated in the frequency component, which possibly affects an adjacent channel or another communication system.

A specific example of the maximum peak electric powers of the input data and sending data of the IFFT unit 4023 will be described below.

Figure 8:
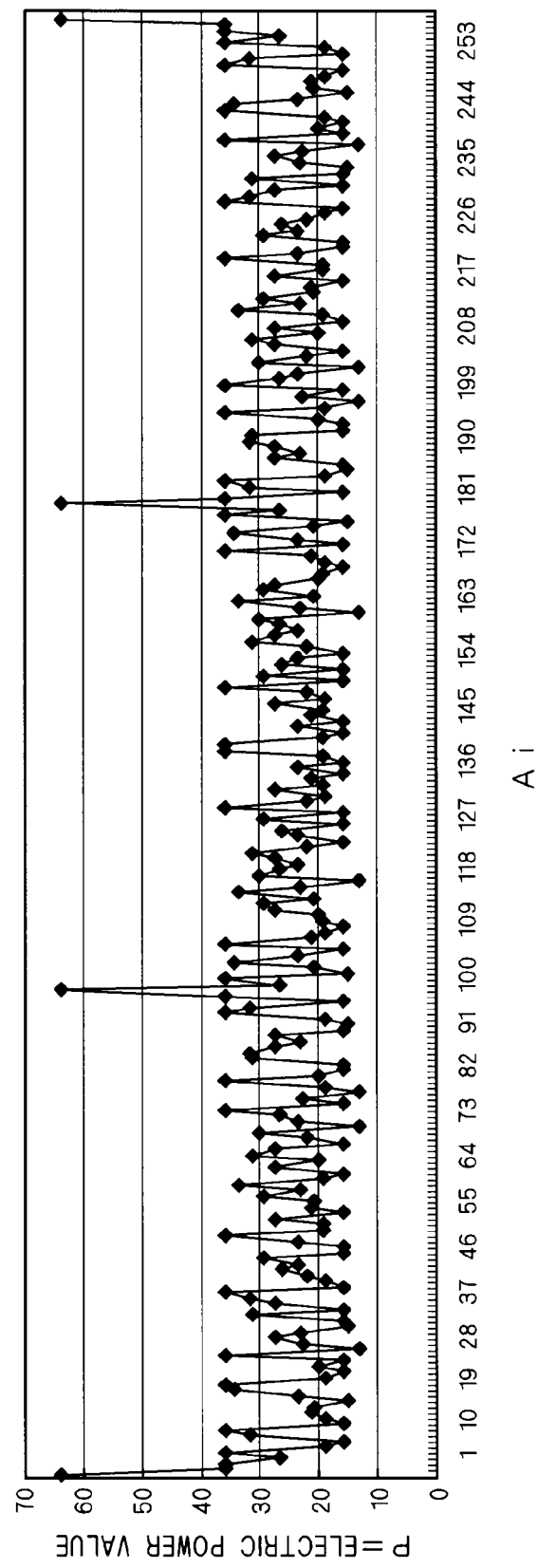
FIG. 8 is a view showing an OFDM output value when various data values are mapped in continuous sub-channels.

FIG. 8 shows an OFDM output value (maximum value in symbol) when various data values are mapped in continuous sub-channels. For the purpose of simple explanation, BPSK (Binary Phase Shift Keying) is used as the data modulation method. However, other modulation methods can basically dealt with equal to BPSK.

In FIG. 8, a vertical axis indicates P (peak electric power) obtained by the following equation (1), and a horizontal axis indicates Ai=0 to 255. Where Ai in the equation (1) is input data fed into the IFFT unit 4023. For example, Ai is expressed by 8-bit binary data.

[Equation 1]

$$P = \text{Max}\left(\left(\sum_{i=1}^{8} Ai \times \sin(i\omega t)\right)^2 + \left(\sum_{i=1}^{8} Ai \times \cos(i\omega t)\right)^2\right) \quad (1)$$

As can be seen from FIG. 8, the maximum value of the peak electric power value is normalized by 64, and the maximum values are obtained at all the bits of "0" (0=00000000b), all the bits of "1" (255=11111111b), 85 (=01010101b), and 170 (=10101010b).

The largest value of 36 is next to the maximum value of 64, and a noteworthy tendency is that a pattern in which only a particular one bit is reversed is included in the whole range of Ai.

That is, 1 (=00000001b), 2 (=00000010b), 4 (=00000100b), 8 (=00001000b), 16 (=00010000b), 32 (=00100000b), 64 (=01000000b), 127 (=01111111b), 128 (=10000000b), 191 (=10111111b), 223 (=11011111b), 239 (=11101111b), 247 (=11110111), 251 (=11111011b), 253 (=11111101b), and 254 (=11111110b) are included in the value of 36 which is the second largest peak electric power value.

It is also found that, for example, 22 (=00010110b) and 61 (=00111101b) are the smallest peak electric power value of 13.29. Therefore, in the case where the transmission control data is formed by all the bits of "0" or "1", PAPR can be minimized by utilizing 22 (=00010110b) and 61 (=00111101b) as the scrambling code, and the communication can be conducted with no bias in the frequency component to prevent the influence on the adjacent channel or another communication system.

Except for the above-described case, In the case of the absence of the sending data, an alternate sending data previously defined from the standpoint of system is used. In such cases, because all the scrambling codes which minimize PAPR can previously be computed, the scrambling is performed using this pattern.

Additionally, a method for changing the scrambling code while changing the number of resource blocks sent by the mobile device is effectively adopted.

For example, a code which is completely different from a scrambling code, in which PAPR becomes the minimum when the number of resource blocks sent is 1, is probably a scrambling code in which PAPR becomes the minimum when the number of resource blocks is 2.

Therefore, the scrambling code is changed according to the number of resource blocks, which allows PAPR to be always kept at the optimum state irrespective of the number of resource blocks.

The scrambling code may be shared by the base station and the mobile device.

For example, it is considered that the scrambling code is shared by fixing the scrambling code in each resource block from the standpoint of system.

That is, it is assumed that a first scrambling code is used from a first resource block while a second scrambling code is used for a second resource block.

In the number of resource blocks used is variable, desirably the case in which the plurality of resource blocks are used is previously defined.

That is, it is considered that a scrambling code A is used in the case of the first and second resource blocks, and a scrambling code B is used in the case of second and third resource blocks.

In this case, a pattern length becomes double, and the mobile device selects the applied scrambling code according to a usage permission frequency band of the base station. However, a procedure of exchanging the scrambling code information is eliminated between the mobile device and the base station, which enables the simplest configuration.

For example, it is considered that the sharing is performed such that the mobile device uses the scrambling code specific to the system at a relative position of the sending frequency band at the data sending timing.

That is, it is considered that, irrespective of the size of the resource block, the scrambling code A is used when only the one resource block is used and the scrambling code B is used when the two resource blocks are used.

In this case, although the reception in the base station becomes slightly complicated, the configuration of the mobile device becomes simpler.

(A-6. Second Modification)

In the above-described first embodiment, in FIG. 2, the data supplied from the transmission control data producing unit 404 to the transmission control data sending unit 405 is first supplied to the transmission control data separation unit 406.

However, in the case of the rich resource, for example, in the case where sending is simultaneously performed to a small number of users, or in the case of the small amount of data except for the data dependent on the transmission resource, the data supplied from the transmission control data producing unit 404 may be directly supplied to the transmission control data replication unit 407 through a previously-provided route bypassing the transmission control data separation unit 406, thereby simplifying the processing of the transmission control data sending unit 405.

(A-7. Third Modification)

In the above-described first embodiment, the transmission control data replication unit 407 replicates the resource independent data such that the number of pieces of resource independent data is equal to the number of transmission resource blocks. Alternatively, the transmission control data replication unit 407 may have a function of generating the dummy data, the replicated resource independent data is mapped in some of the transmission resource blocks, and the resource independent data is set at a dummy fixed value having all the bits of "0" or "1" or the amplitude is set at zero during the sending in the rest of the resource blocks.

A trade-off relationship holds between the number of bits which sets the amplitude at zero during the sending and the number of replicas of the resource independent data, an error-resistant property is strengthened to conduct the good communication as the number of pieces of replicated data is increased, and an interference electric power with surrounding base stations is lowered as the number of bits which set the amplitude at zero during the sending is increased.

In the case where the resource independent data is set at the dummy fixed value having all the bits of "0" or "1", the known-series data can be sent, when data is delivered to which position is recognized.

That is, because the reception device side knows "0" or "1" of the data, a propagation channel can be estimated from the state of the data change, and the data can be demodulated by multiplying of reverse characteristics of the data.

Because accuracy of propagation channel estimation is enhanced to improve the reception characteristics as the number of bits is increased in the known series data, when the number of replicas of the resource independent data exceeds a predetermined value, the reception characteristics are improved by sending the known-series data as much as possible rather than sending the many pieces of resource independent data.

An example of data similar to the amplitude set at zero during the sending will be described below. For example, 16QAM (Quadrature Amplitude Modulation) is adopted by way of example, and FIG. 27 shows an example of a signal point layout.

Figure 27:
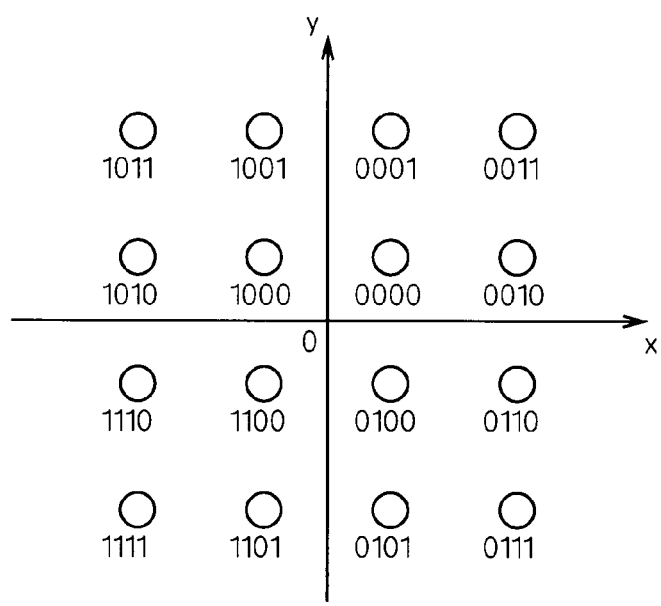
FIG. 27 is a view showing an example of a signal point layout in the case of 16QAM.

As shown in FIG. 27, in the case of the mapping of a 4-bit data in which the two lower-level bits are the resource dependent data and the two higher-level bits are the dummy fixed value which is set instead of the resource independent data, assuming that the dummy fixed value is set at 00, the data having the smallest amplitude from an origin becomes 0000 in 0001, 0011, 0000, and 0010 located in a first quadrant of FIG. 27.

Because the interference electric power with surrounding base stations is lowered decreasing the amplitude, the interference electric power with surrounding base stations can be lowered by, for example, controlling the number of pieces of replicated data according to a traffic amount in surrounding base stations, or setting the dummy fixed value specific to the base station from a base station installation environment.

(A-8. Fourth Modification)

In the above-described first embodiment, the resource block is defined as the minimum sending unit allocated for the sending of the mobile device, or an integral multiple of the minimum sending unit allocated for the sending of the mobile device. Depending on wireless quality necessary for the system, it is not always necessary that the resource block be defined as the minimum sending unit allocated for the sending of the mobile device, or an integral multiple of the minimum sending unit allocated for the sending of the mobile device. For example, the resource block may be formed by a fraction of an integer of the minimum sending unit allocated for the sending of the mobile device.

(B. Second Embodiment)

(B-1. Configuration of Wireless Communication Device)

Figure 9:
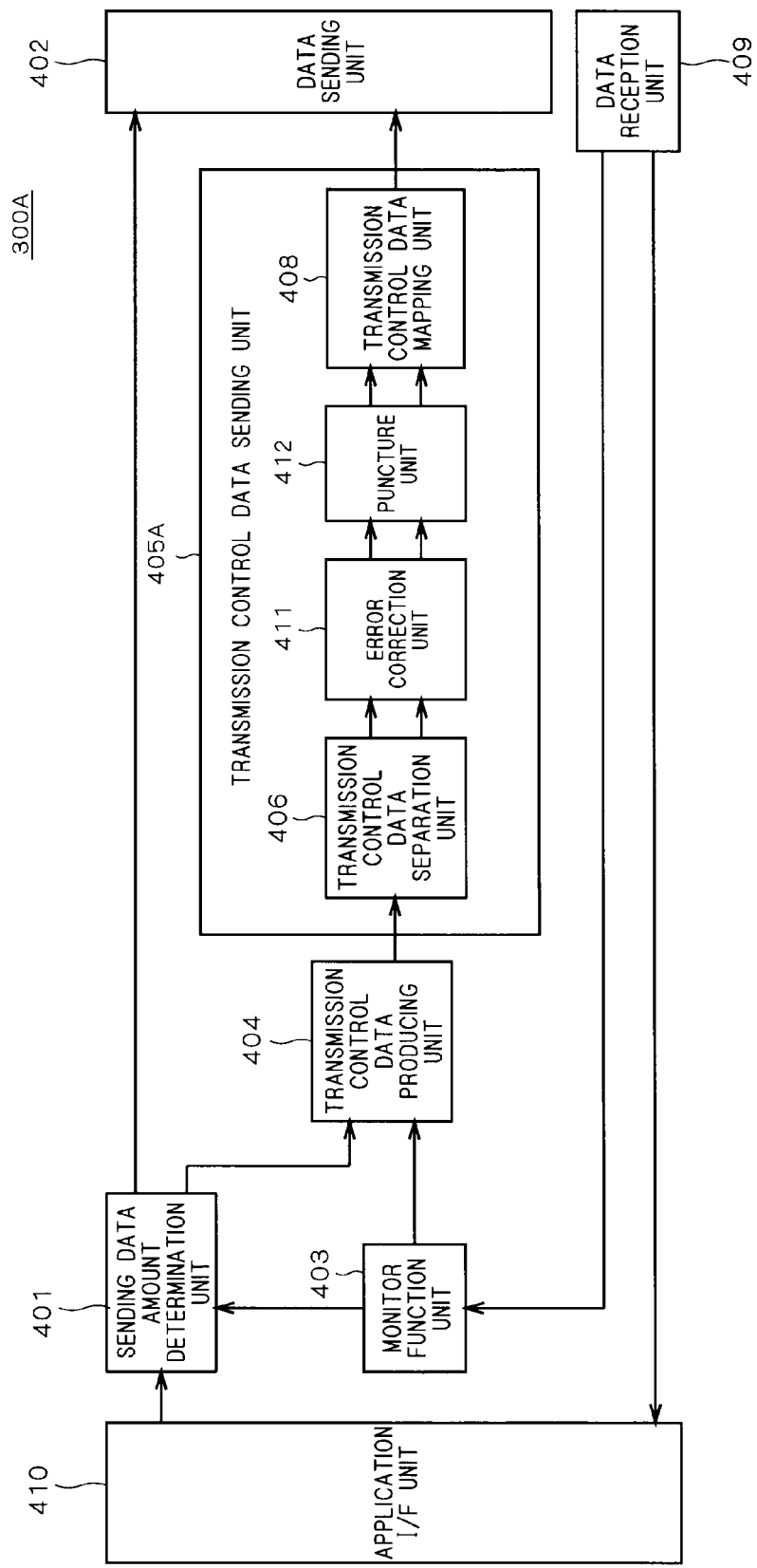
FIG. 9 is a block diagram showing a configuration of a wireless communication device according to a second embodiment of the present invention.

FIG. 9 is a block diagram showing a configuration of a sending unit of a wireless communication device 300A constituting the base station and mobile device in a wireless communication device according to a second embodiment of the present invention. Because the base station and the mobile device basically have the same function, only the mobile device is described below.

The wireless communication device 300A of FIG. 9 includes a transmission control data sending unit 405A instead of the transmission control data sending unit 405 in the wireless communication device 300 of FIG. 2. The same configuration as the transmission control data sending unit 405 of FIG. 1 is designated by the same numeral, and the redundant description is omitted.

The transmission control data sending unit 405A includes the transmission control data separation unit 406, an error correction unit 411, a puncture unit 412, and the data mapping unit 408.

(B-2. Configuration and Operation of Transmission Control Data Sending Unit)

A configuration and an operation of the transmission control data sending unit 405A will be described in detail below. The data supplied from the transmission control data producing unit 404 to the transmission control data sending unit 405A includes various pieces of data such as the time at which the sending is determined, the frequency, the antenna, and the data amount, and the pieces of data are first supplied to the transmission control data separation unit 406.

The transmission control data separation unit 406 separates the pieces of data into the resource dependent data and the resource independent data.

The resource dependent data and resource independent data separated by the transmission control data separation unit 406 are separately fed into the error correction unit 411, error correction coding processing is performed to the resource dependent data and the resource independent data, and the resource dependent data and the resource independent data are supplied to the puncture unit 412.

The puncture unit 412 performs puncture processing to the resource independent data.

The resource dependent data and the resource independent data to which the puncture processing is performed are supplied to the transmission control data mapping unit 408 and the resource dependent data and the resource independent data are mapped in the wireless format.

An example of processing performed by the transmission control data sending unit 405A will schematically be described with reference to FIGS. 9 and 10. In the following description, it is assumed that the number of sending resource blocks is two.

Figure 10:
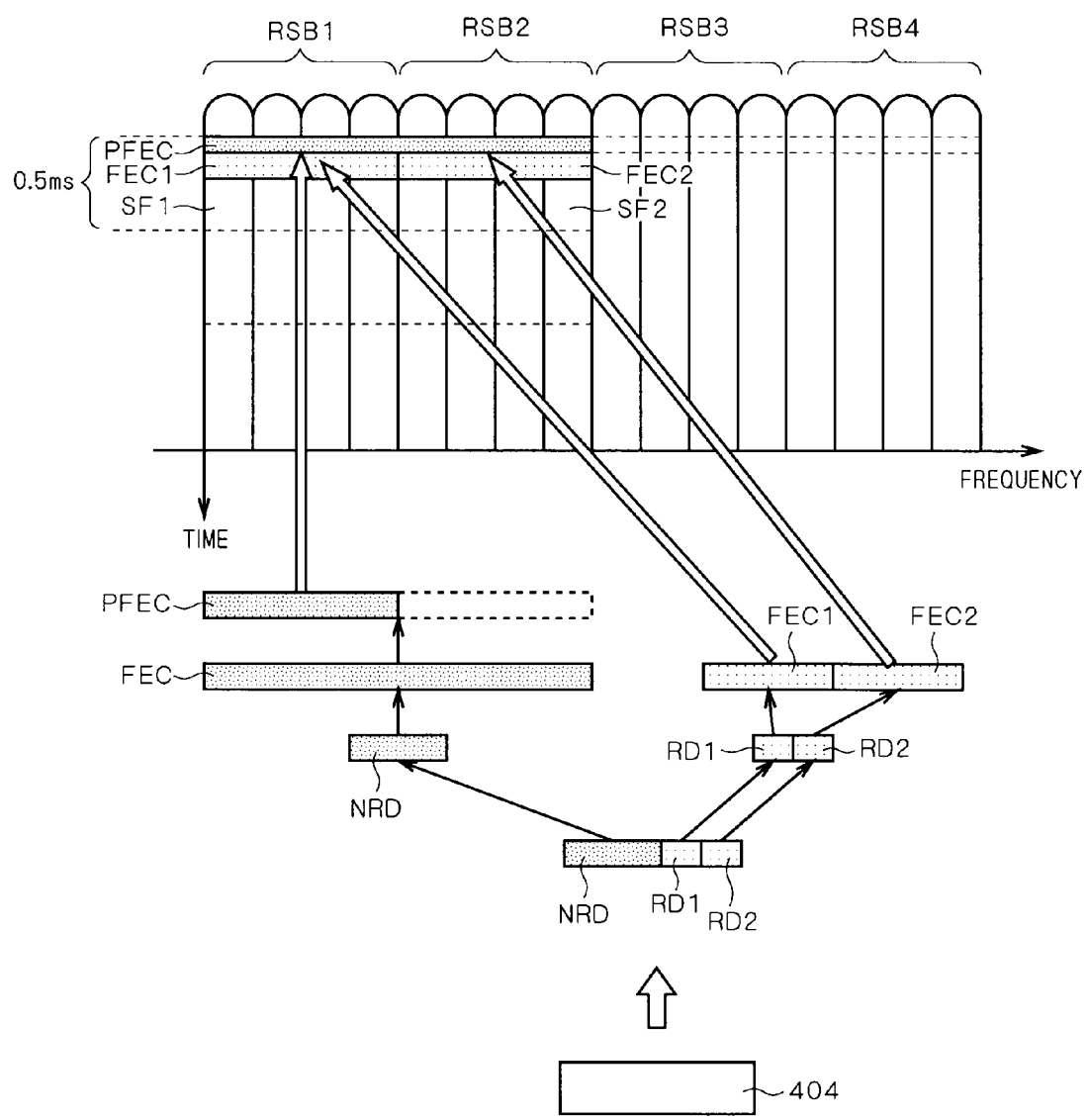
FIG. 10 is a view showing an example of transmission control data mapping.

FIG. 10 shows an example in which the transmission control data temporally occupies part of one sub-frame. In FIG. 10, one sub-frame is set at 0.5 ms by way of example, and the time advances toward the downward direction. Each resource block includes the plurality of sub-carriers (carrier waves) having different frequencies, and the frequency of the sub-carrier is increased toward the right in FIG. 10.

As shown in FIG. 10, transmission control data separation unit 406 (FIG. 9) separates the transmission control data supplied from the transmission control data producing unit 404 (FIG. 9) into the resource independent data NRD and the pieces of resource dependent data RD1 and RD2. At this point, because the pieces of resource dependent data RD1 and RD2 are provided for each resource block according to the number of transmission resource blocks, the pieces of resource dependent data RD1 and RD2 are separated according to each resource block.

The error correction unit 411 performs the error correction coding of the resource independent data at a low coding ratio.

In FIG. 9, the mobile device uses the four resource blocks RSB1, RSB2, RSB3, and RSB4 at a maximum, and the error correction coding is performed at the coding ratio suitable to the number of bits of the transmission control data allocated to the four resource blocks. The resource independent data NRD becomes error correction coding data FEC (error-correction-coded resource independent data), the pieces of resource dependent data RD1 and RD2 become pieces of error correction coding data FEC1 and FEC2 (error-correction-coded resource dependent data) respectively. The error correction coding is performed to the pieces of error correction coding data FEC1 and FEC2 at the coding ratio which can be allocated to the minimum unit of each resource block.

The amount of data of resource independent data NRD is larger than that of the pieces of resource dependent data RD1 and RD2. When the error correction coding is performed at the same coding ratio, the error correction coding data FEC is allocated across the four resource blocks RSB1 to RSB4, and the pieces of error correction coding data FEC1 and FEC2 are allocated across any two of the four resource blocks RSB1 to RSB4.

However, in the case where the base station permits only the resource blocks RSB1 and RSB2 to be used, the error correction coding data FEC becomes excess-bit data.

Therefore, the puncture unit 412 performs the puncture processing to the bits of the error correction coding data FEC which is originally allocated to the resource blocks RSB3 and RSB4, namely, the puncture unit 412 deletes all the bits to make the error correction coding data FEC non-sending. The data is referred to as punctured error correction coding data PFEC (punctured resource independent data).

The transmission control data mapping unit 408 (FIG. 9) maps the punctured error correction coding data PFEC and the pieces of error correction coding data FEC1 and FEC2 in a predetermined sub-frame of a predetermined resource block.

For example, in FIG. 10, the punctured error correction coding data PFEC is mapped across all the sub-carriers in each of the sub-frames SF1 and SF2 of the resource blocks RSB1 and RSB2, and the pieces of error correction coding data FEC1 and FEC2 are mapped across all the sub-carriers in the sub-frames SF1 and SF2 respectively.

The sub-frames SF1 and SF2 are sub-frame in the same time slot, and the punctured error correction coding data PFEC and the pieces of error correction coding data FEC1 and FEC2 are mapped in the sub-frames in the different time slots.

(B-3. Effect)

As described above, even if the wireless communication device includes the error correction unit 411 to perform the error correction coding, the puncture unit 412 deletes the excess bit to prevent the bias of the data amount depending on the resource block, so that any transmission resource block becomes the same transmission control data format.

Therefore, in the reception processing unit of the base station which is of the recipient, the same processing as that of the maximum usable case can be performed every time to easily perform demodulation irrespective of the number of resource blocks used, and the hardware can be easily implemented to obtain the high-speed, stable, inexpensive wireless communication device.

In the case of the same number of bits used in the wireless sending, the reception characteristics having excellent fading characteristics can be obtained by the simple bit replica.

(B-4. First Modification)

In the above-described second embodiment, the error correction unit 411 of the transmission control data sending unit 405A performs the error correction coding of the resource independent data at the low coding ratio. Alternatively, the error correction coding may be performed with a frequency bandwidth (that is, the number of resource blocks) which can be used by the mobile device at a coding ratio which is suitable to a smaller frequency bandwidth in the frequency bandwidths which can be allocated by the base station.

That is, when the coding ratio is lowered, a computation amount (for example, path metric computation in Viterbi decoding) for computing reliability data tends to be increased in an error correction decoder of the reception-side device. However, when the error correction coding is performed according to the smaller frequency bandwidth, the extremely low coding ratio which is not set in the system can be prevented, and a load on the reception-side device is not increased in decoding processing.

The error correction coding may be performed at a coding ratio suitable to a maximum usable frequency bandwidth (that is, the number of resource blocks) of which the mobile device is permitted by the base station.

In this case, the simultaneously-usable maximum frequency width can be obtained even if the mobile device uses various frequencies in each sub-frame sent by frequency hopping.

(B-5. Second Modification)

In the above-described second embodiment, in FIG. 9, the data supplied from the transmission control data producing unit 404 to the transmission control data sending unit 405A is first supplied to the transmission control data separation unit 406.

However, in the case of the rich resource, for example, in the case where sending is simultaneously performed to a small number of users, or in the case of the small amount of data except for the data dependent on the transmission resource, all the pieces of data supplied from the transmission control data producing unit 404 may be directly supplied to the error correction unit 411 through a previously-provided route bypassing the transmission control data separation unit 406, thereby simplifying the processing of the transmission control data sending unit 405A.

(B-6. Third Modification)

In the error correction method in which all the bits of "0" or "1" or the data in which only one of bits is reversed is also supplied as the output data of the error correction unit 411 when the input data of the error correction unit 411 of the transmission control data sending unit 405A is the fixed data having all the bits of "0" or "1" as described in FIG. 9, as described in the first embodiment, the transmission control data mapping unit 408 multiplies the scrambling code having no bias toward the particular frequency component, that is, good frequency characteristics, which allows the sending of the signal having the low PAPR.

(B-7. Configuration of Reception Unit)

Figure 11:
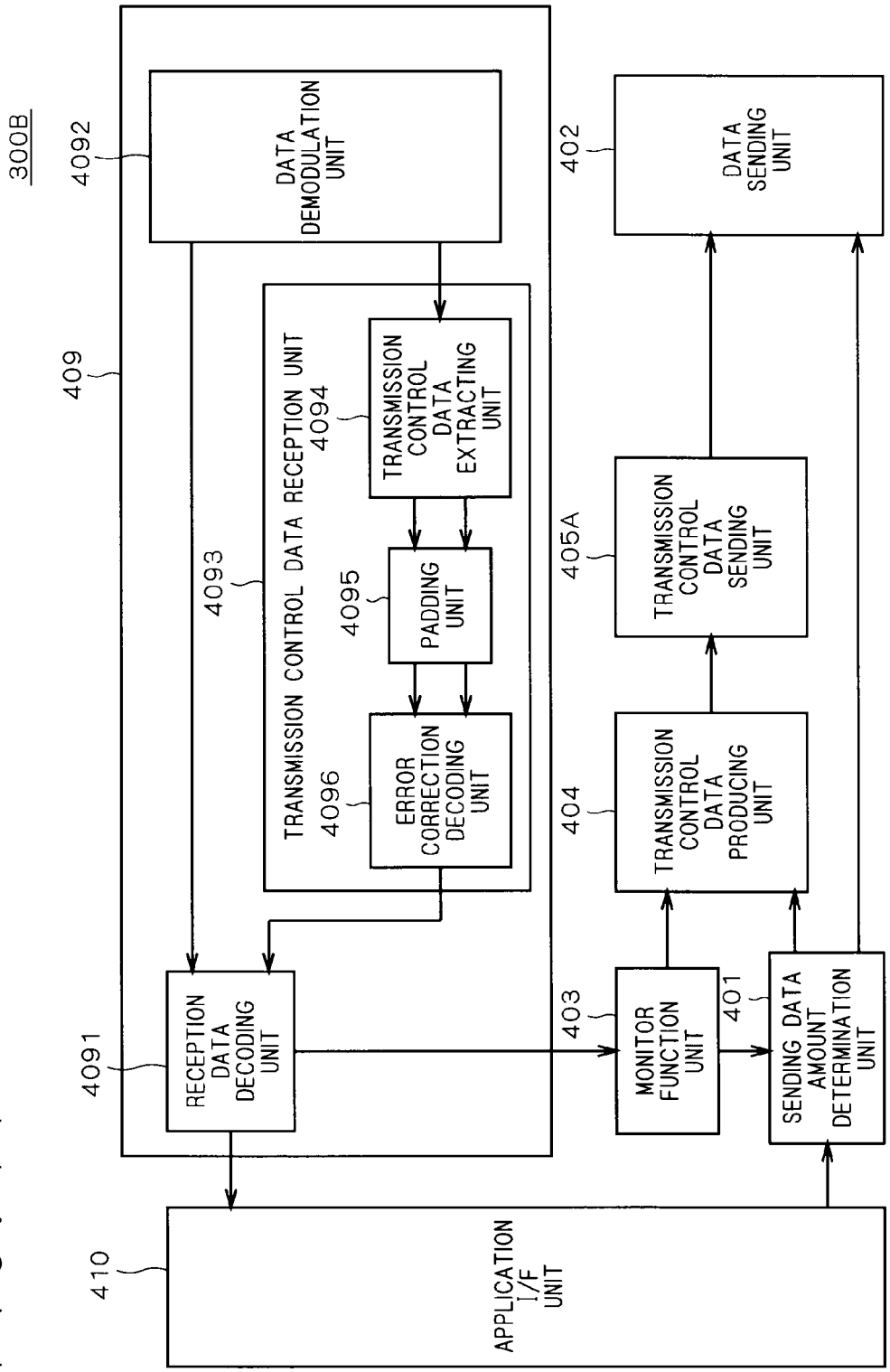
FIG. 11 is a block diagram showing a configuration of a wireless communication device including a data reception unit and a data sending unit.

FIG. 11 shows a configuration of a wireless communication device 300B including a data reception unit and a data sending unit. In FIG. 11, the data sending unit has the same configuration as that of FIG. 9. The same configuration as that of FIG. 9 is designated by the same numeral, and the redundant description is omitted.

As shown in FIG. 11, the data reception unit 409 includes a reception data decoding unit 4091, a data demodulation unit 4092, and a transmission control data reception unit 4093. The transmission control data reception unit 4093 includes a transmission control data extracting unit 4094, a padding unit 4095, and an error correction decoding unit 4096.

In the data reception unit 409, the signal received by an antenna (not shown) is fed into the data demodulation unit 4092, and the data decoding unit 4092 performs down-convert such as demodulation processing corresponding to SC-FDMA and OFDMA and demodulation processing for demodulating the multi-level-modulated data.

All the pieces of reception data to which time multiplication, frequency multiplication, or diffusion code multiplication is performed is supplied to the transmission control data extracting unit 4094, and the transmission control data extracting unit 4094 extracts the transmission control data, and the transmission control data extracting unit 4094 separates the data into the data (resource dependent data) dependent on the transmission resource and other pieces of data (resource independent data) and supplies the separated pieces of data to the padding unit 4095.

The padding unit 4095 performs padding of the dummy data having the lowest reliability to a resource block point which is not used on the sending side for each of the resource dependent data and resource independent data, and the pieces of data are supplied to the error correction decoding unit 4096 while separated from each other.

Because generally the resource dependent data and the resource independent data differ from each other in the number of sending bits or required quality, the resource dependent data and the resource independent data has different error correction methods, and the error correction decoding unit 4096 performs the pieces of error correction decoding which are defined for resource dependent data and resource independent data respectively. The error correction decoding processing is independent of the presence or absence of the puncture.

The error-correction-decoded transmission control data is supplied to the reception data decoding unit 4091, and the reception data decoding unit 4091 performs the decoding processing to the error-correction-decoded transmission control data. The reception data, demodulated by the data demodulation unit 4092, except for the transmission control data is directly supplied to the reception data decoding unit 4091, and the decoding processing is performed to the reception data on the basis of the transmission control data. The decoded data is fed into the application I/F unit 410.

Although the determination result of ACK/NACK of HARQ (Hybrid ARQ) obtained from the decoded data and the wireless line quality data from the data demodulation unit 4092 are transmitted to the monitor function unit 403, the illustration thereof are omitted in FIG. 11.

(C. Third Embodiment)

(C-1. Outline)

A wireless communication device according to a third embodiment of the present invention in which data can efficiently be transmitted even if data sending is not performed for a long time will be described below.

In the case where the data is demodulated by a wireless communication device on the reception side, a wireless communication device on the sending side estimates what change is happened in a wireless propagation channel by receiving known data (known series) of "0" or "1". Sometimes the known series is expressed by a replica signal, a reference signal, a pilot signal, a sync word, and a preamble.

Examples of propagation channel estimation include a method for performing the estimation by detecting the reception timing (data leading-end detection in modulation symbol units by known-series pattern and higher-accuracy data leading-end detection in which Nyquist is detected by selecting the most probable one while oversampled modulation symbol is set at a sample unit), a method for performing the estimation by phase change detection (phase rotation amount is detected by such as a phase value of a known-series portion and linear interpolation between the known series), and a method for performing the estimation by detection of a change in amplitude component (detection of temporal change in signal component or detection of temporal change in ratio of a signal component to a noise in a system in which the noise is assumed to be constant).

Because the accuracy of transmission channel estimation is enhanced as the number of known series is increased, the reception characteristics such as BER (Bit Error Rate) are improved in the reception-side wireless communication device.

It is considered that sending-side wireless communication device (such as the mobile devices 301 and 302 shown in FIG. 1) resumes the sending after the sending is not performed for a while.

Figure 12:
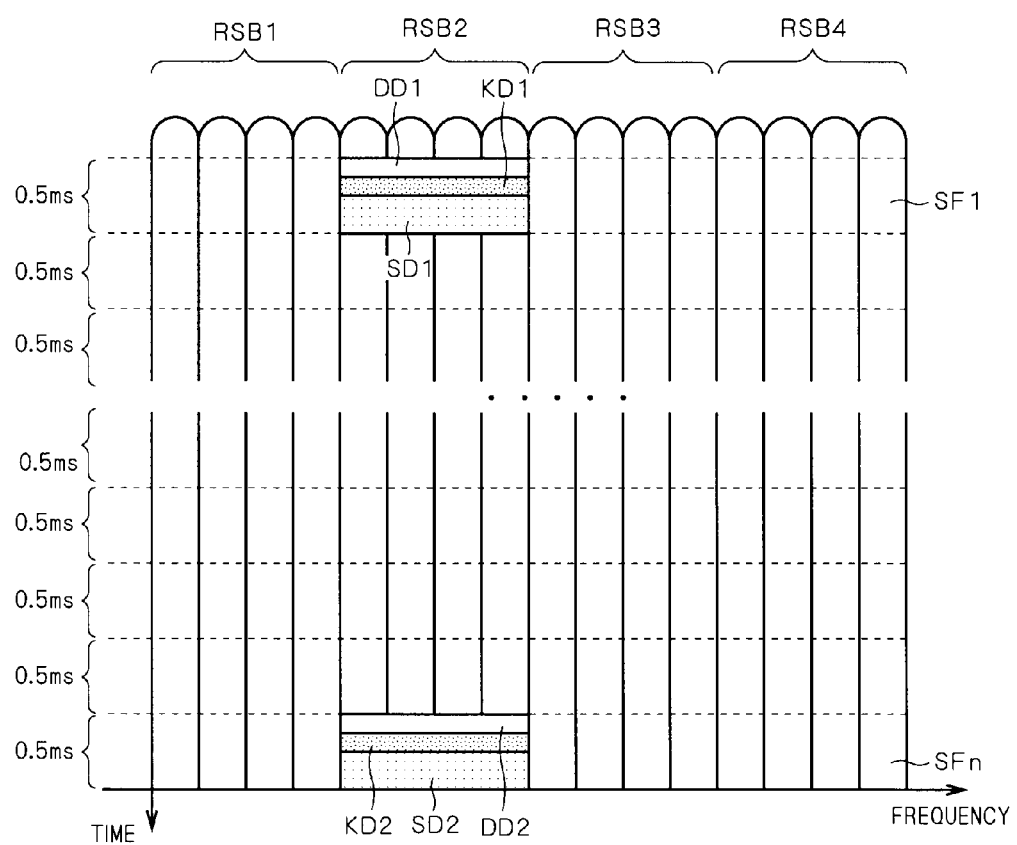
FIG. 12 is a view schematically showing a state in which a sending-side wireless communication device resumes sending.

FIG. 12 is a view schematically showing the state in which the sending-side wireless communication device resumes the sending. In FIG. 12, one sub-frame is set at 0.5 ms and the time advances toward the downward direction by way of example. Each resource block includes the plurality of sub-carriers (carrier waves) having different frequencies, the frequency of the sub-carrier is increased toward the right in FIG. 12.

In FIG. 12, it is assumed that the mobile device uses the four resource blocks RSB1, RSB2, RSB3, and RSB4 at a maximum.

As shown in FIG. 12, sending data SD1, known-series data KD1, and the transmission control data DD1 are mapped in the sub-frame SF1 of the resource block RSB2, and sending data SD2, known-series data KD2, and transmission control data DD2 are mapped in the sub-frame SFn of the resource block RSB2.

In such cases, because the known series does not exist in the temporal neighborhood for the data of sub-frame SFn, the accuracy of transmission channel estimation cannot be enhanced.

Generally, a trade-off relationship holds between the number of bits of the known series and the number of bits which can be used to transmit the substantial sending data, and an amount of substantial sending data transmission is decreased even if the transmission channel is in the good state in which the number of known series is increased to improve the reception characteristics.

On the contrary, when the number of known series is decreased, the amount of substantial sending data transmission is increased in the good transmission channel state, and a reception data error caused by a transmission channel estimation error is increased in the bad transmission channel state due to such as fading by interference or moving.

Therefore, the third embodiment provides a device in which a balance is achieved between the stable reception characteristics and improvement of the transmission speed of the substantial sending data by previously sending the known series in the case where the sending is resumed after the sending is not performed for a while to the opposite wireless communication device.

(C-2. Propagation Channel Estimation Method)

An example of the propagation channel estimation (phase change detection) in which the known series is used will be described.

It is assumed that the following known series is assumed as a typical example in the QPSK (Quadrature Phase Shift Keying) modulation method.

I=+1, −1, +1, −1, +1, −1, +1, −1
Q=+1, +1, −1, −1, −1, −1, +1, +1

That is, it is assumed that the following expressions hold:

$$\text{Ref}(I1)=+1, \text{Ref}(Q1)=+1$$

$$\text{Ref}(I2)=-1, \text{Ref}(Q2)=+1$$

$$\text{Ref}(I3)=+1, \text{Ref}(Q3)=-1$$

$$\text{Ref}(I4)=-1, \text{Ref}(Q4)=-1$$

$$\text{Ref}(I5)=+1, \text{Ref}(Q5)=-1$$

$$\text{Ref}(I6)=-1, \text{Ref}(Q6)=-1$$

$$\text{Ref}(I7)=+1, \text{Ref}(Q7)=+1$$

$$\text{Ref}(I8)=-1, \text{Ref}(Q8)=+1.$$

Where Ref(I1) to Ref(I8) and Ref(Q1) to Ref(Q8) indicate a reference signal.

It is also assumed that the following expressions hold:

$$\text{Ref}(1)=(\text{Ref}(I1),\text{Ref}(Q1))$$

$$\text{Ref}(2)=(\text{Ref}(I2),\text{Ref}(Q2))$$

$$\text{Ref}(3)=(\text{Ref}(I3),\text{Ref}(Q3))$$

Ref(4)=(Ref(I4),Ref(Q4))

Ref(5)=(Ref(I5),Ref(Q5))

Ref(6)=(Ref(I6),Ref(Q6))

Ref(7)=(Ref(I7),Ref(Q7))

Ref(8)=(Ref(I8),Ref(Q8)).

Figure 13:
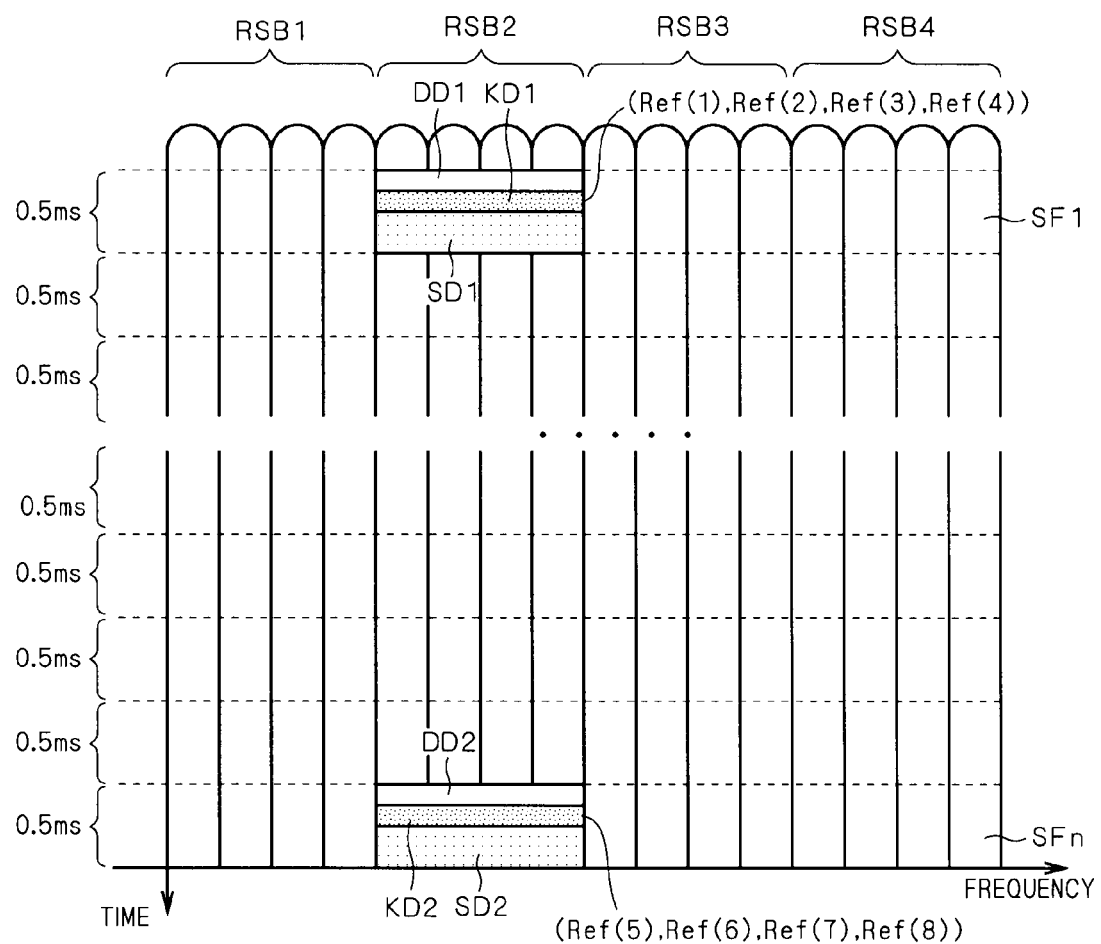
FIG. 13 is a view explaining a mapping state of known series data when a sending-side wireless communication device resumes sending.

FIG. 13 shows the state in which the above-described data is applied to the pieces of known-series data KD1 and KD2 shown in FIG. 12.

As shown in FIG. 13, the known-series data KD1 of the sub-frame SF1 has Ref(1) to R(4), the known-series data KD2 of the sub-frame SFn has Ref(5) to Ref(8), and there is a time difference between the pieces of data.

The pieces of known-series data are shared by the sending-side device and the reception-side device before communication is conducted. The pieces of known-series data may be stored in the memory of each device, or the pieces of known-series data may be obtained by receiving a message from an upper-level device or a device used by a user before communication start.

An example in which the reception data does not have the over sample will be described below.

In the case where the reception data is completely identical to the sending data because of the good propagation channel state, the reception data becomes as follows:

Rec(I1)=+1, Rec(Q1)=+1

Rec(I2)=−1, Rec(Q2)=+1

Rec(I3)=+1, Rec(Q3)=−1

Rec(I4)=−1, Rec(Q4)=−1

Rec(I5)=+1, Rec(Q5)=−1

Rec(I6)=−1, Rec(Q6)=−1

Rec(I7)=+1, Rec(Q7)=+1

Rec(I8)=−1, Rec(Q8)=+1 and, it is assumed that the following expressions hold:

Rec(1)=(Rec(I1),Rec(Q1))

Rec(2)=(Rec(I2),Rec(Q2))

Rec(3)=(Rec(I3),Rec(Q3))

Rec(4)=(Rec(I4),Rec(Q4))

Rec(5)=(Rec(I5),Rec(Q5))

Rec(6)=(Rec(I6),Rec(Q6))

Rec(7)=(Rec(I7),Rec(Q7))

Rec(8)=(Rec(I8),Rec(Q8)).

At this point, the amount of phase change is obtained from a vector product using the following equation (2).

[Equation 2]

$$\sin^{-1}\left[\frac{\left(\sum_{k=1}^{4} Rec(Ik) \times Ref(Ik),\right) \times \left(\sum_{k=5}^{8} Rec(Qk) \times Ref(Qk)\right) - \left(\sum_{k=1}^{4} Rec(Qk) \times Ref(Qk),\right) \times \left(\sum_{k=5}^{8} Rec(Ik) \times Ref(Ik)\right)}{\sqrt{\left(\sum_{k=1}^{4} Rec(Ik) \times Ref(Ik),\right)^2 + \left(\sum_{k=1}^{4} Rec(Qk) \times Ref(Qk),\right)^2} \times \sqrt{\left(\sum_{k=5}^{8} Rec(Ik) \times Ref(Ik)\right)^2 + \left(\sum_{k=5}^{8} Rec(Qk) \times Ref(Qk)\right)^2}}\right] \quad (2)$$

Because of a numerator=4×4−4×4 in the equation (2), the equation (2) becomes zero (no phase change).

Then, it is assumed that the following reception data is obtained.

Rec(I1)=+1, Rec(Q1)=+1

Rec(I2)=−1, Rec(Q2)=+1

Rec(I3)=+1, Rec(Q3)=−1

Rec(I4)=−1, Rec(Q4)=−1

Rec(I5)=0, Rec(Q5)=−√2

Rec(I6)=−√2, Rec(Q6)=0

Rec(I7)=√2, Rec(Q7)=0

Rec(I8)=0, Rec(Q8)=√2 in this case, the amount of phase change of −45 degrees is obtained by the equation (2).

That is, in FIG. 13, it is found that the propagation environment is changed by the movement of the opposite device between Rec(4) and Rec(5).

In this case, the phase rotation of −45 degrees cannot be recognized when the second-half known series (that is, the known-series data KD2 of the sub-frame SFn) does not exist, and it is recognized that the phase is similar to that of the first-half known series.

Figure 14:
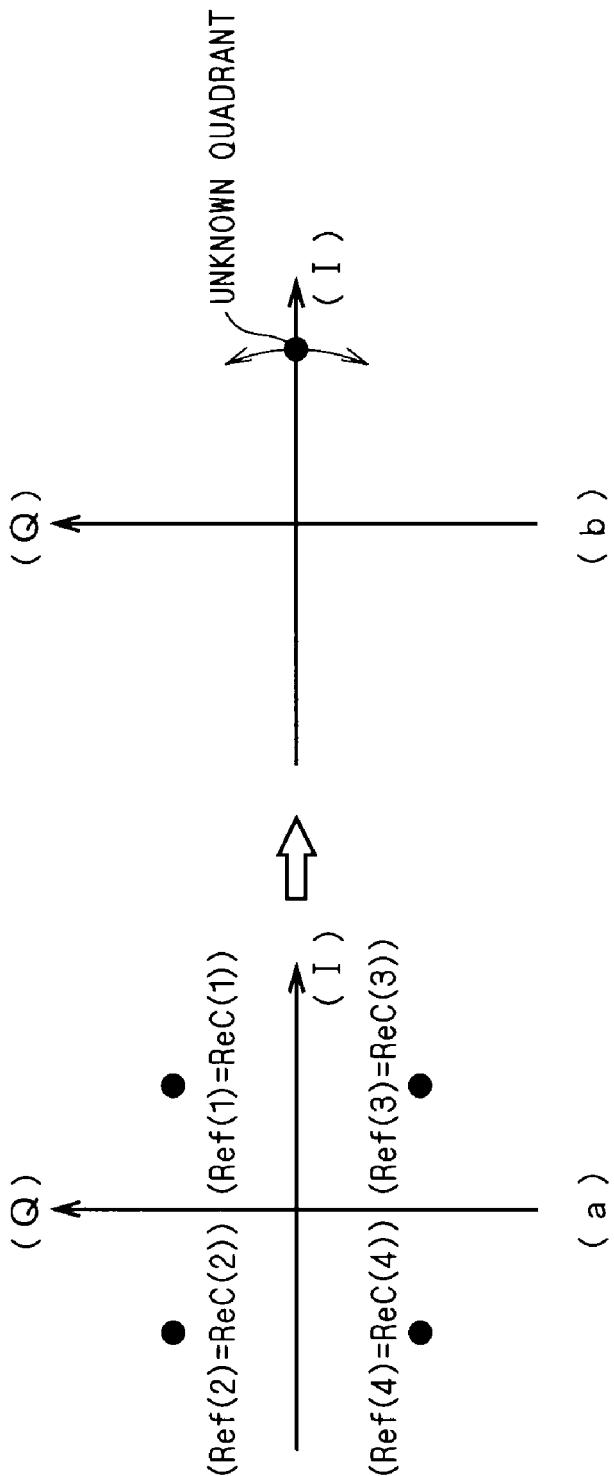
FIG. 14 is a view explaining a problem point in a case where a phase of the sending data is rotated.

FIGS. 14(a) and 14(b) are phase diagrams schematically showing this state. In FIG. 14(a), the vertical axis indicates a Q-axis and the horizontal axis indicates an I-axis, and Ref(1) (=Rec(1)), Ref(2)(=Rec(2)), Ref(4)(=Rec(4)), and Ref(3) (=Rec(3)) are plotted in the first quadrant to fourth quadrant respectively. Because the second-half known series is not recognized, it is not found in which quadrant the reception data is located as shown in FIG. 14(b). When the second-half phase is taken as the same phase as the first half, determination error occurs with a probability of 50%.

(C-3. Configuration of Wireless Communication Device)

Figure 15:
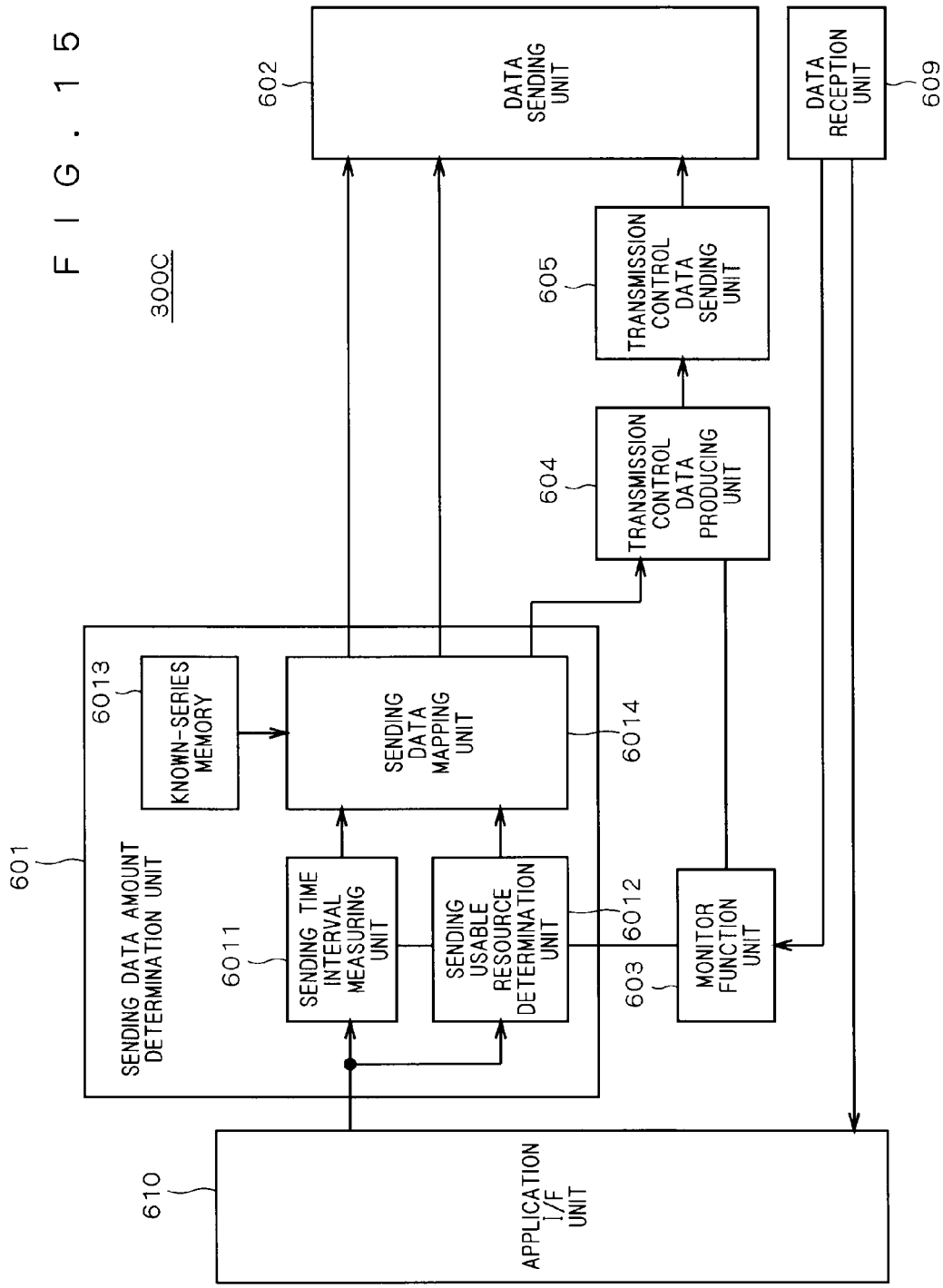
FIG. 15 is a block diagram showing a configuration of a wireless communication device according to a third embodiment of the present invention.

FIG. 15 is a block diagram showing a configuration of a data sending unit of a wireless communication device 300C constituting the base station and mobile device in a wireless communication device according to a third embodiment of the present invention. Because the base station and the mobile device basically have the same function, only the mobile device is described below.

The wireless communication device 300C of FIG. 15 includes a sending data amount determination unit 601, a data sending unit 602, a monitor function unit 603, a transmission control data producing unit 604, a transmission control data sending unit 605, a data reception unit 609, and an application I/F (interface) unit 610. The sending data amount determination unit 601 includes a sending time interval measuring unit 6011, a sending usable resource determination unit 6012, a known-series memory 6013, and a sending data mapping unit 6014.

The application I/F unit 610 has a function of imparting the sending data generated by an application loaded on the mobile device to the sending data amount determination unit 601.

The sending usable resource determination unit 6012 of the sending data amount determination unit 601 determines what time, which frequency, and how much data is sent to which antenna, when the plurality of sending antennas are provided, based on input data supplied from monitor function unit 603 which monitors the data reception unit 609 and input data supplied from the application I/F unit 610.

The sending data in which the sending is determined by the sending usable resource determination unit 6012 is supplied to the sending data mapping unit 6014, the sending data mapping unit 6014 maps the sending data in the regulation wireless format, and the sending data mapping unit 6014 supplies the sending data as usual sending data 613 to the data sending unit 602.

The sending time interval measuring unit 6011 measures an interval between the pieces of data sent to the base station, the sending data mapping unit 6014 sends known series 614 to the data sending unit 602 when the measurement result becomes not lower than a predetermined threshold.

The known series 614 is a fixed value in a system manner, or the known series 614 is obtained from an upper-level device or a device used by the user before communication start and the one previously stored in the known-series memory 6013 is used.

The sending data mapping unit 6014 supplies the pieces of data such as the time at which the sending is determined, the frequency, the antenna, and the data amount (amount of data for making a request of sending permission to the base station) to the transmission control data producing unit 604. The sending data mapping unit 6014 also supplies the identification information on the opposite device which becomes the other party to the transmission control data producing unit 604. The identification information on the opposite device is allocated by the upper-level device before the data communication start, and the identification information on the opposite device is stored in a predetermined memory (not shown).

The transmission control data producing unit 604 transforms the time at which the sending is determined, the frequency, the antenna, the data amount, and the identification information on the opposite device into the regulation bit format in which the base station receives the pieces of data, and the transmission control data producing unit 604 supplies the transformed pieces of data as transmission control data to the transmission control data sending unit 605.

A method in which temporal information sent from the transmission control data is neglected by setting a sending time after the fixed delay sub-frame is also effectively adopted.

The transmission control data sending unit 605 transforms the supplied transmission control data into a predetermined wireless format to supply the transformed transmission control data to the data sending unit 602.

The data sending unit 602 performs the multi-level modulation processing, the SC-FDMA modulation processing, the up-convert, and the processing for amplifying the electric power to the required sending electric power value to the transmission control data transformed into the wireless format, and the data sending unit 602 performs the sending through an antenna (not shown).

The monitor function unit 603 extracts the sending permission data from the base station in signal supplied from the data reception unit 609. For example, in the system to which ARQ is applied, the monitor function unit 603 extracts ACK/NACK (confirmation answer/negative answer) data from the base station. Additionally, the monitor function unit 603 can also have a function of extracting the frequency of the sending permission data and the data sending amount of the sending permission data along with the sending permission data.

The monitor function unit 603 also has a function of producing the measurement data sent to the base station for the purpose of the downstream communication.

Desirably the sending data mapping unit 6014 sends the known series instead of the usual sending data 613 and the transmission control data, when it is assumed that the base station cannot perform the reception for a long time because a non-sending state is continued for a predetermined period.

A threshold for the non-sending time is simply set at a fixed value in a system manner. Alternatively, for example, the threshold for the non-sending time may be determined using a mobile device moving speed, and a maximum phase rotation amount obtained from the sending frequency.

In the case of the determination threshold of non-sending time×maximum phase rotation amount>phase modulation, it is necessary that many known series be sent to recover phase estimation performance of the receiver of the base station. For example, in the case of the mobile device moving speed ($\Delta v$) of 3 km/h, assuming that sending frequency (f) is 2 GHz, a deviation in frequency is expressed by well-known Doppler frequency $\Delta f$, and $\Delta f=(\Delta v/c) \times f=((3 \times 10^3/3600) \text{m/s}/3 \times 10^8) \times 2 \times 10^9 = 5.5$ Hz.

On the other hand, because the frequency in which one wavelength is set at 0.5 ms becomes 2 kHz, the phase change becomes $360 \times 5.5/2000 = 1$ degree during one sub-frame=0.5 ms.

Assuming that the phase change can be permitted up to 22.5 degrees in the QPSK modulation method, the threshold is determined by 22 sub-frames=11 ms.

The mobile device moving speed may be set at a fixed value which is permissible in the wireless standard, or the mobile device moving speed may be computed using GPS (Global Positioning System) mounted on the mobile device. The mobile device moving speed is computed from a temporal change of well-known three-point surveying on the base station side and the mobile device may be notified of the computed value of the mobile device moving speed.

(C-4. Known-Series Sending Timing)

The timing at which the known series is sent will further be described below. As described above, in the reception-side wireless communication device (such as the base stations 201 and 202 shown in FIG. 1), the deterioration of the data reception characteristics is caused by the small amount of known series, thereby increasing the data error rate.

Figure 16:
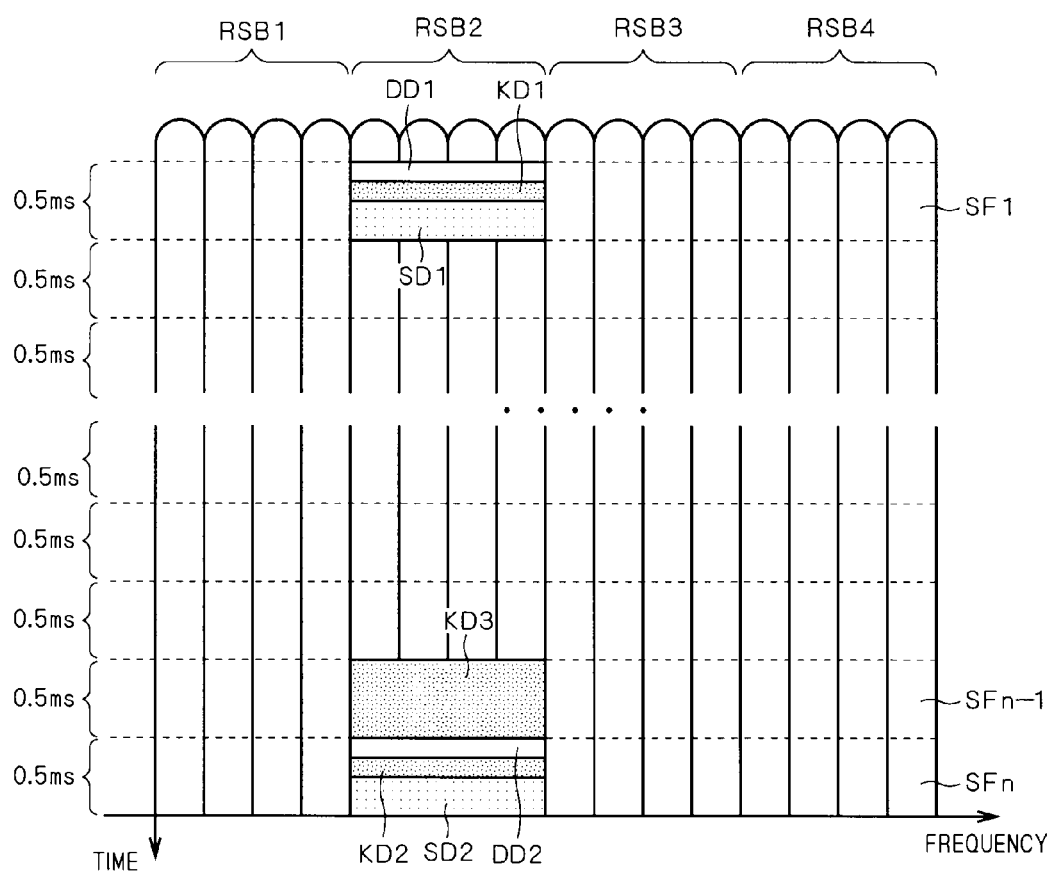
FIG. 16 is a view explaining an operation for sending only known series before usual data is transmitted in a usual sending format.

Therefore, in the case where the data transmission is resumed, as shown in FIG. 16, only the known series is sent before the usual sending data is transmitted in the usual sending format.

That is, in FIG. 16, the sending data SD1, known-series data KD1, and transmission control data DD1 are mapped in the sub-frame SF1 of the resource block RSB2, and the sending data SD2, the known-series data KD2, and the transmission control data DD2 are mapped in the sub-frame SFn of the resource block RSB2. However, only the known-series data KD3 is mapped in the sub-frame SFn-1 of the resource block RSB2.

The identification information on the opposite device transmitted by the transmission control data DD2 and the known-series data may be sent by the KD3. An indicator indicating that the known-series data is included may be included in the known-series data KD3.

In the case of the wireless format in which the good transmission channel estimation is required compared with the transmission control data DD2 because the multi-level modulation such as 64QAM is performed to the sending data SD2, the sub-frame having only the transmission control data DD2 is effectively sent in advance.

There is no problem in that the transmission control data DD2 is ahead of the known-series data KD3. The case in which the transmission control data DD2 is ahead of the known-series data KD3 is effectively used, in the case where a procedure of sending an answer signal to the transmission control data DD2 using the opposite device is defined in the system manner. The answer signal is demodulated by the data reception unit 609, extracted by the monitor function unit 603, and fed into the sending data amount determination unit 601.

Accordingly, only the known series is sent before the usual sending data is transmitted in the usual sending format, so that the reception data error caused by the transmission channel estimation error can be prevented even if the propagation environment is changed due to the movement of the opposite device.

Sending only the known series is not limited to the immediately preceding time of the data transmission resumption, but the known series may be sent by the resource block which is different from that of the transmission resuming data.

Figure 17:
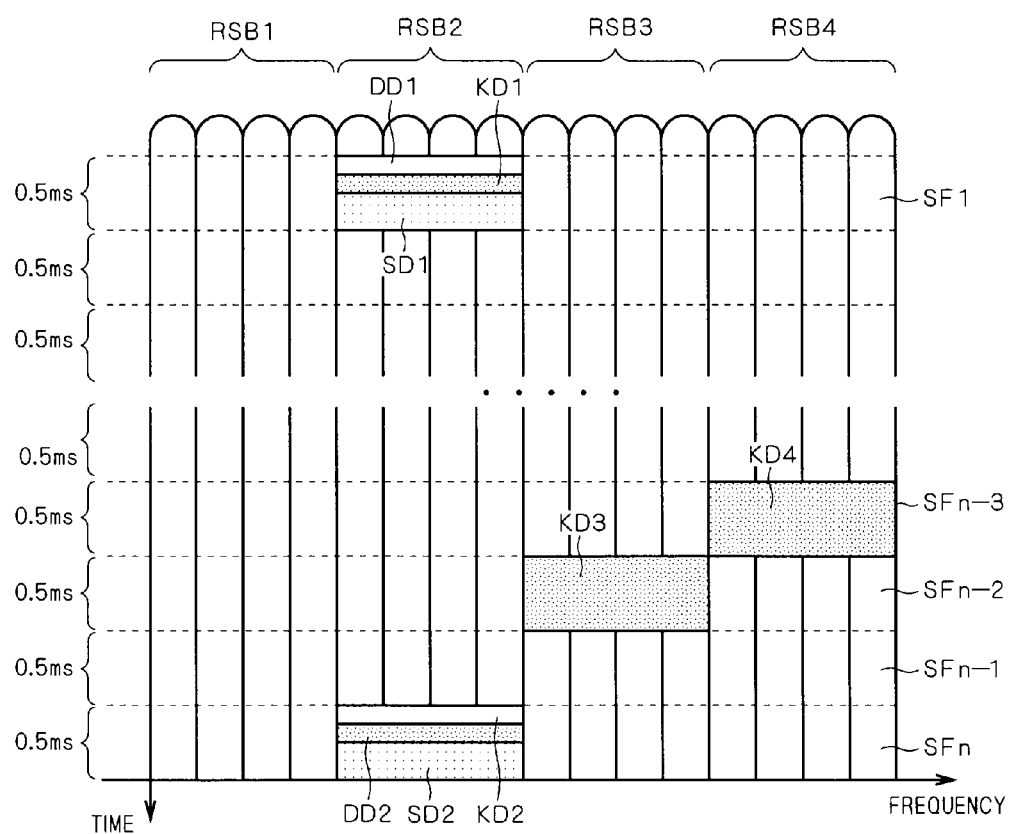
FIG. 17 is a view explaining an operation for sending only known series before usual data is transmitted in a usual sending format.

For example, as shown in FIG. 17, only the known-series data KD3 may be mapped in the sub-frame SFn-2 of the resource block RSB3, or only the known-series data KD4 may be mapped in the sub-frame SFn-3 of the resource block RSB4.

In such cases, the reception data error caused by the transmission channel estimation error can also be prevented even if the propagation environment is changed due to the movement of the opposite device.

Figure 18:
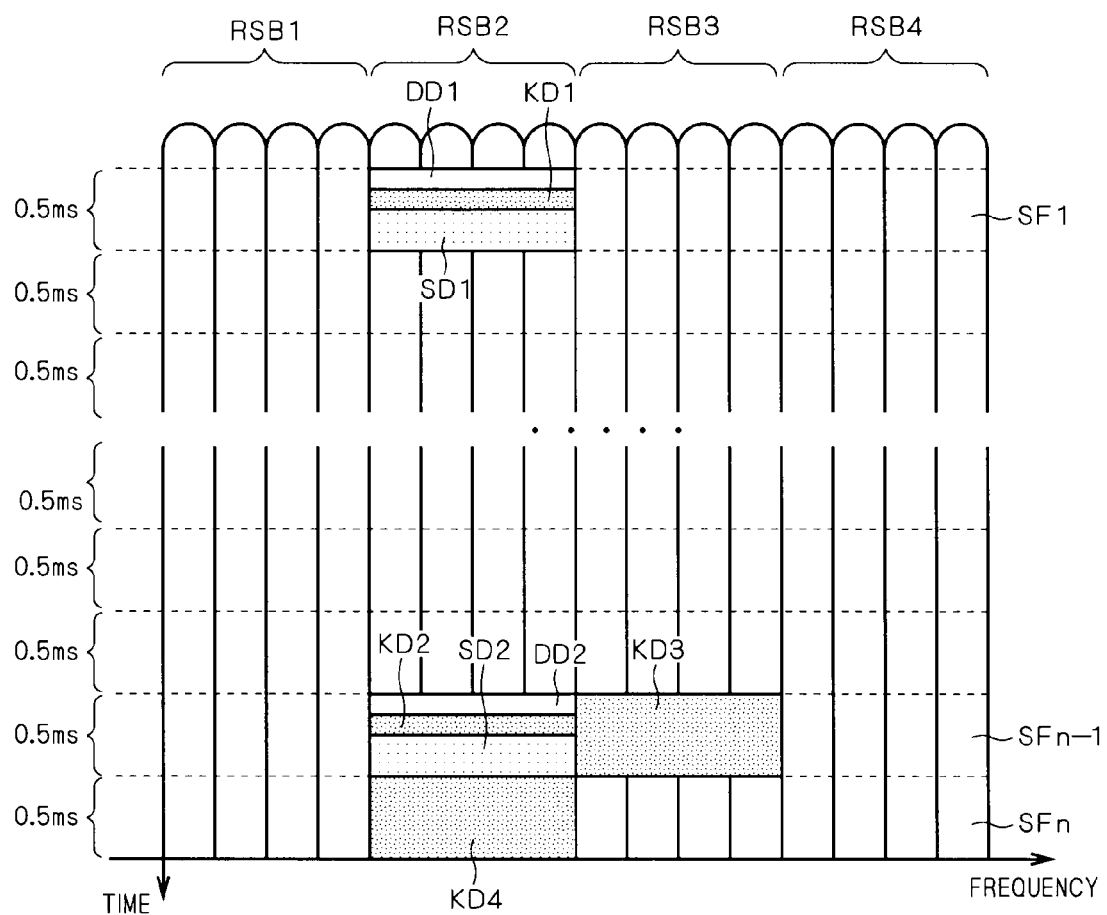
FIG. 18 is a view explaining an operation for sending only known series at the same time or after usual data is transmitted in a usual sending format.

In another example, as shown in FIG. 18, assuming that the sending data SD2, the known-series data KD2, and the transmission control data DD2 are mapped as the transmission resuming data in the sub-frame SFn-1 of the resource block RSB2, only the known-series data KD3 may be mapped in the sub-frame SFn-1 of the resource block RSB3 to simultaneously send the known-series data KD3 along with the transmission resuming data, or only the known-series data KD4 may be mapped in the sub-frame SFn of the resource block RSB2 to send the known-series data KD4 after the transmission resuming data.

In such cases, the reception data error caused by the transmission channel estimation error can be prevented even if the propagation environment is changed due to the movement of the opposite device.

Figure 19:
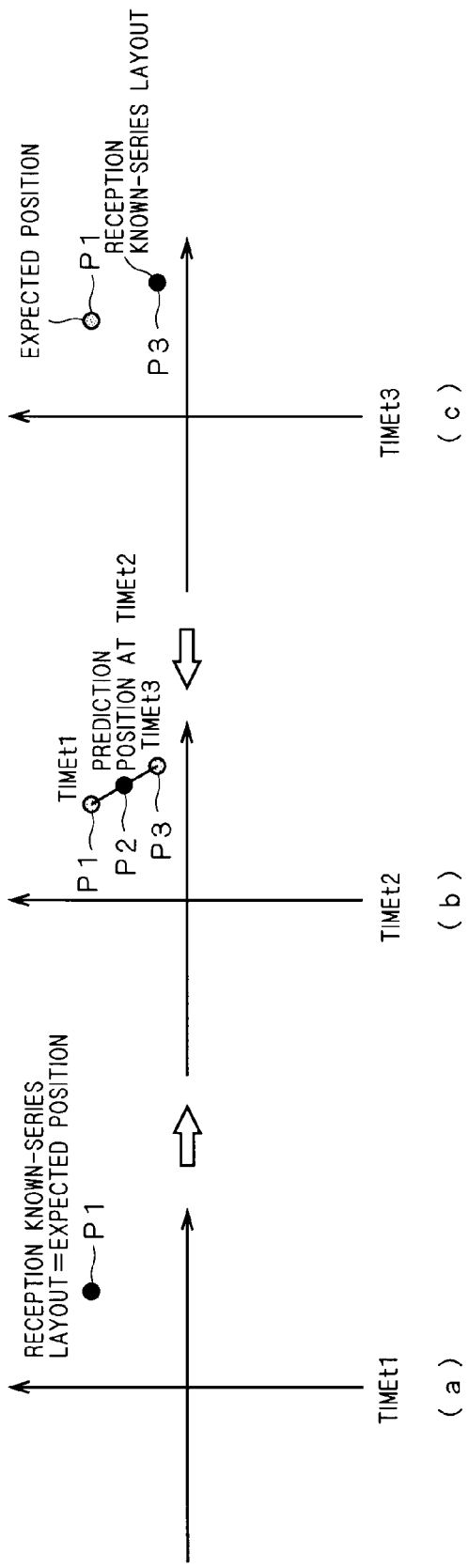
FIG. 19 is a view explaining a principle in which a phase is estimated by interpolation.

FIGS. 19(a), 19(b), and 19(c) show a principle in which the phase is estimated.

In FIG. 19(a), a position of the known series received by the reception-side wireless communication device is plotted as a point P1 at a time t1. Because the point P1 is the initial sending, the point P1 is located at the same position as an expected position of the known series (expected position).

In FIG. 19(c), a position of the received known series in the case where the sending is resumed is plotted as a point P3 at a time t3 in which some time elapses since the initial sending.

At this point, the expected position of the known series (expected position) is located at a position corresponding to the point P1.

As shown in FIG. 19(b), a position (point P2) of the known series is predicted at a time t2 from linear interpolation (interpolation) based on the positions P1 and P3 of the received known series at the time t1 and time t3, and the phase of the usual sending data can correctly be obtained by multiplying an inverse function of the change in position (amount of phase change between the times t2 and t1).

Accordingly, as shown in FIGS. 20(a), 20(b), and 20(c), it is easily presumed that the known series can be predicted at a time t4 by extrapolation.

That is, FIG. 20(a) is a view in which the position of the known series received by the reception-side wireless communication device is plotted as the point P1 at the time t1, and FIG. 20(b) is a view in which the position of the received known series in the case where the sending is resumed is plotted as the point P3 at the time t3 when some time elapses since the initial sending.

Figure 20:
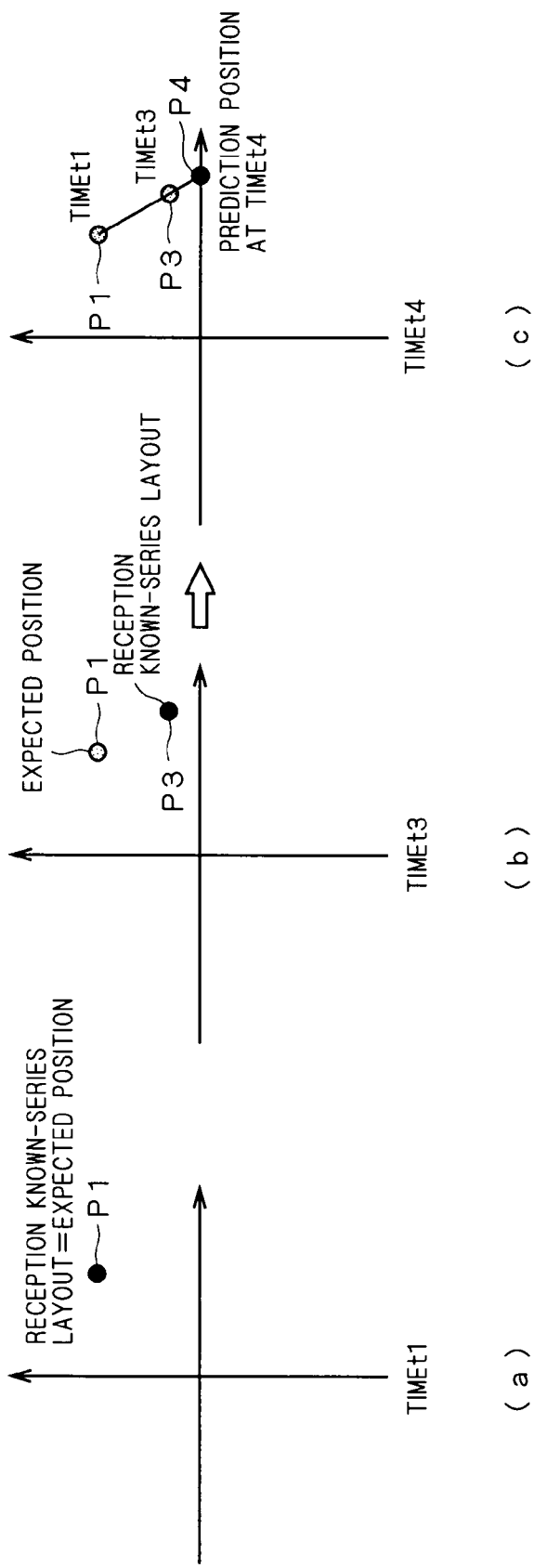
FIG. 20 is a view explaining a principle in which a phase is estimated by extrapolation.

As shown at (c) part of FIG. 20, a position (point P4) of the known series is predicted at a time t4 from linear interpolation (extrapolation) based on the positions P1 and P3 of the received known series at the time t1 and time t3, and the phase of the usual sending data can correctly be obtained by multiplying an inverse function of the change in position (amount of phase change at t4 and t1 or t4 and t3).

In the above description, the prediction is performed by the linear interpolation and extrapolation. When the prediction with a well-known multidimensional function is used, the prediction accuracy can further be improved.

Figure 21:
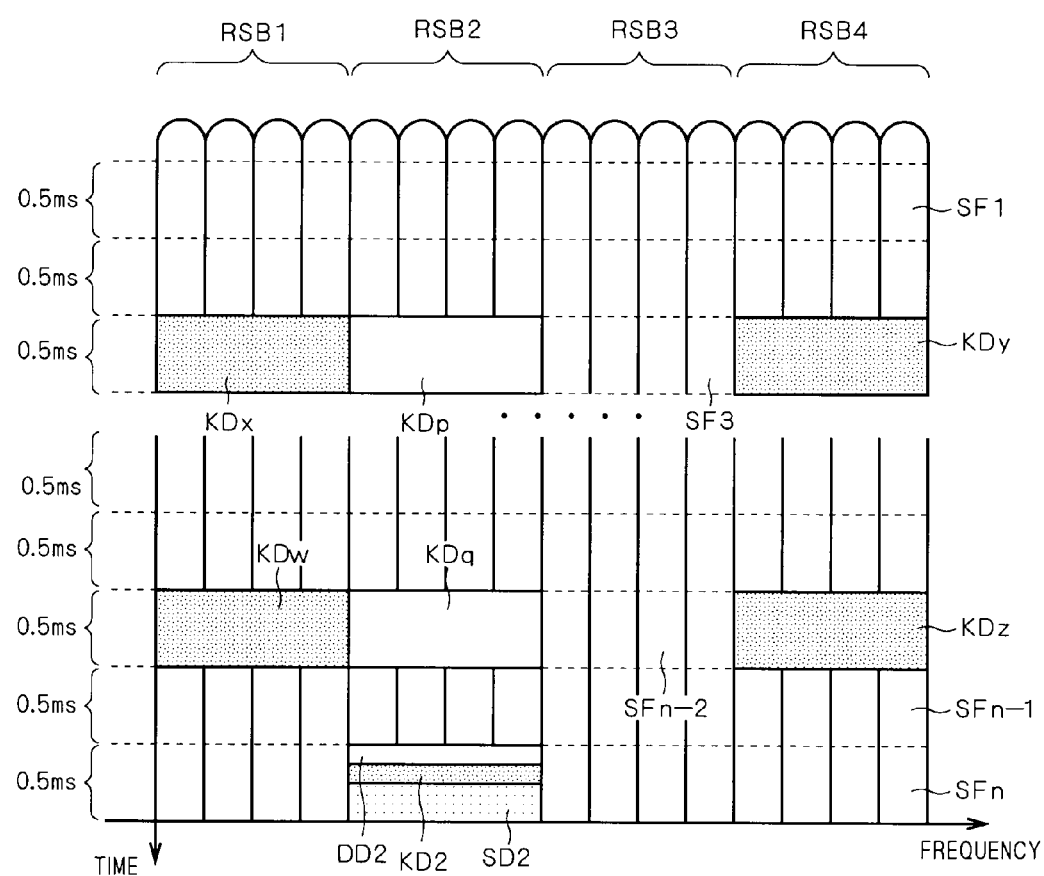
FIG. 21 is a view explaining a concept when a phase is estimated in a frequency direction.

During the prediction, in the case where the known series is disposed in the resource blocks having different frequencies, desirably not only the temporal direction is estimated, but also the estimation similar to that of the time is independently performed in the frequency direction. FIG. 21 shows a concept of this prediction.

In FIG. 21, the sending data SD2, known-series data KD2, and transmission control data DD2 are mapped as the transmission resuming data in the sub-frame SFn of the resource block RSB2, and pieces of known-series data KDx and KDy are mapped in the sub-frame SF3 of the resource block RSB1 and RSB4. Pieces of known-series data KDw and KDz are mapped in the sub-frame SFn-2 of the resource block RSB1 and RSB4.

Accordingly, known series is disposed in the resource block which is different from that of the transmission resuming data. In such cases, the frequency direction is estimated using the pieces of known-series data KDx and KDy to map estimated known-series data KDp on the resource block RSB2, and the frequency direction is estimated using the pieces of known-series data KDw and KDz to map estimated known-series data KDq on the resource block RSB2. Then, the temporal direction is estimated using the pieces of estimated known-series data KDp or KDq.

The accuracy of transmission channel estimation is improved by sending the known series located in both the temporal and frequency manners closer to the resource which sends the usual sending data to estimate the transmission channel.

Accordingly, when the phase is estimated using various known series located in the temporal and frequency manners close to or away from the resource, a small weighting coefficient is multiplied for the known series located away from the resource, and a large weighting coefficient is multiplied for the known series located close to the resource, which allows the accuracy of transmission channel estimation to be improved. The known series are effectively sent a plurality of times in continuous manner.

(C-5. First Operation Example of Sending Data Amount Determination Unit)

A first operation example of the sending data amount determination unit 601 will be described below with reference to FIGS. 22 and 23.

Figure 22:
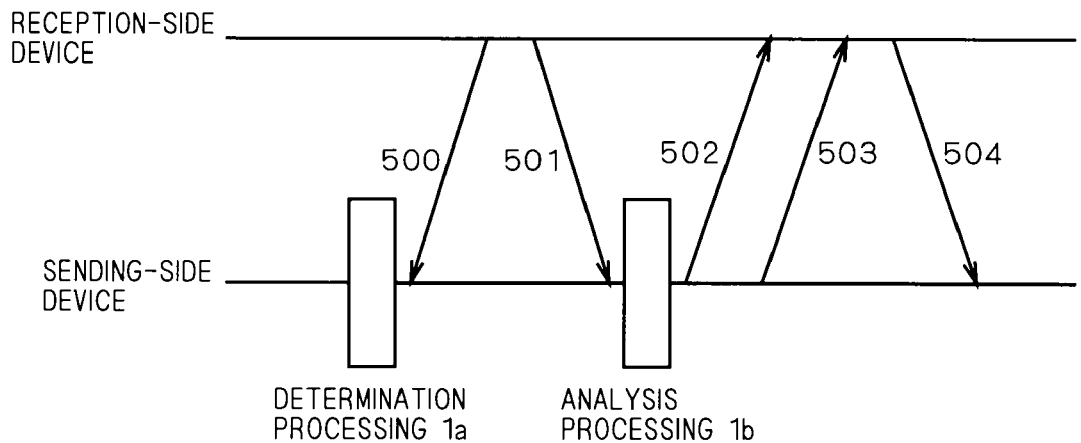
FIG. 22 is a view schematically showing determination processing and analysis processing for determining a message flow and message contents between a reception-side device and a sending-side device.

FIG. 22 is a view schematically showing determination processing 1a and analysis processing 1b for determining a message flow and message contents between the reception-side device and the sending-side device.

In the case where data is received from the reception-side device such that the reception-side device is caused to send the propagation channel quality information (such as reception transmission channel estimation data through each antenna for performing sending diversity or MIMO, data of SINR or CINR in which the known-series signal such as Pilot is used, and substantial quality margin data (CQI) including the receivable buffer amount), the sending-side device performs the determination processing 1a. FIG. 23 shows a flowchart of the determination processing 1a.

Figure 23:
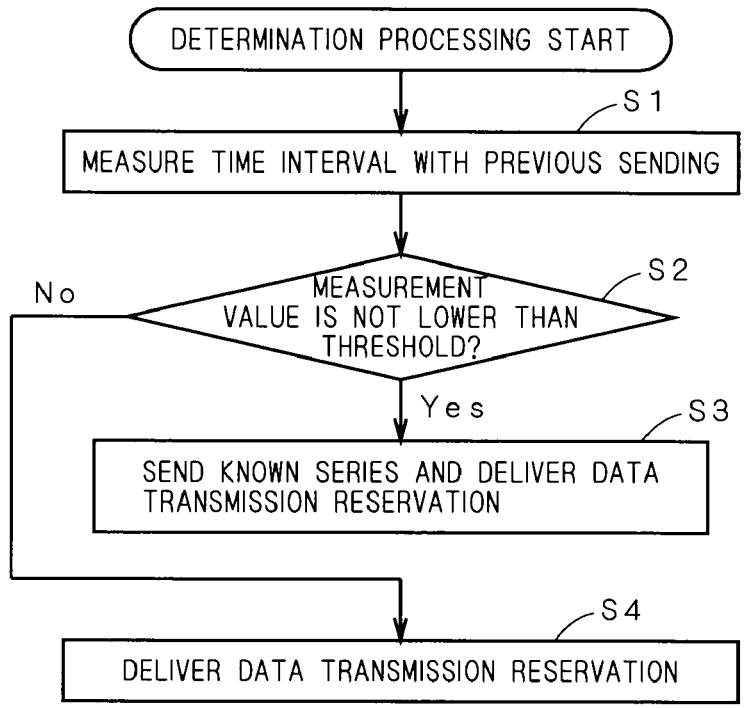
FIG. 23 is a flowchart explaining an example of determination processing.

As shown in FIG. 23, when the sending-side device starts the determination processing, the sending time interval measuring unit 6011 measures a time interval from the last sending (step S1).

The sending data mapping unit 6014 determines whether or not the measurement value is not lower than a predetermined threshold (step S2). When the measurement value is not lower than the threshold and when the opposite device cannot uniquely be defined by the sending frequency or sending timing because the plurality of opposite devices exist, data transmission reservation 500 in which the identification information on the opposite device and the known-series sending are combined is delivered to the reception-side device (step S3).

In step S2, when the measurement value is lower than the threshold, it is not necessary to send the known-series data (step S4).

At this point, the data transmission reservation 500 includes usage resource information for sending the known series, for example, information in which a frequency resource block number and sending timing can be determined (information on the number of sub-frames after the last sending).

The mobile device identification information may previously be stored in a nonvolatile memory, or the mobile device identification information may be allocated and stored in a predetermined memory by the upper-level device before the data communication start.

As shown in FIG. 22, when the reception-side device receives the data transmission reservation 500, the reception-side device sends an answer signal 501. When the sending-side device receives the answer signal 501, the sending-side device analyzes the answer signal 501 through analysis processing 1b. In the case of the receivable state, the sending-side device sends a known series 502 on the basis of result of determination processing 1a, and the sending-side device sends sending data 503.

In the case where the reception-side device can receive the sending data 503, the reception-side device sends a normal reception completion signal 504.

As described above, in the case where the reception-side device sends the answer signal 501, it is effective for the sending-side device to correctly confirm whether or not the data transmission reservation 500 is received. On the other hand, for the sending-side device, because the normal reception completion signal 504 is sent during the normal reception, the answer signal 501 can be replaced by the normal reception completion signal 504 even if the answer signal 501 is neglected. Therefore, the sending of the answer signal 501 can be neglected to form a simpler system.

The determination whether or not the known-series sending is required can adequately be made by adopting the first operation described above.

(C-5-1. First Modification)

A first modification of the first operation example of the sending data amount determination unit 601 will be described below with reference to a flowchart of FIG. 24.

Depending on the sub-frame size or the number of sub-carriers in the resource block, the reception-side device cannot possibly establish the sufficient synchronization in order to ensure predetermined SNR (Signal to Noise Ratio) or SINR only when the known series is imparted to one sub-frame. Therefore, the number of sending times of the known series is effectively changed by providing a plurality of thresholds according to magnitude of the time interval from the last sending.

Figure 24:
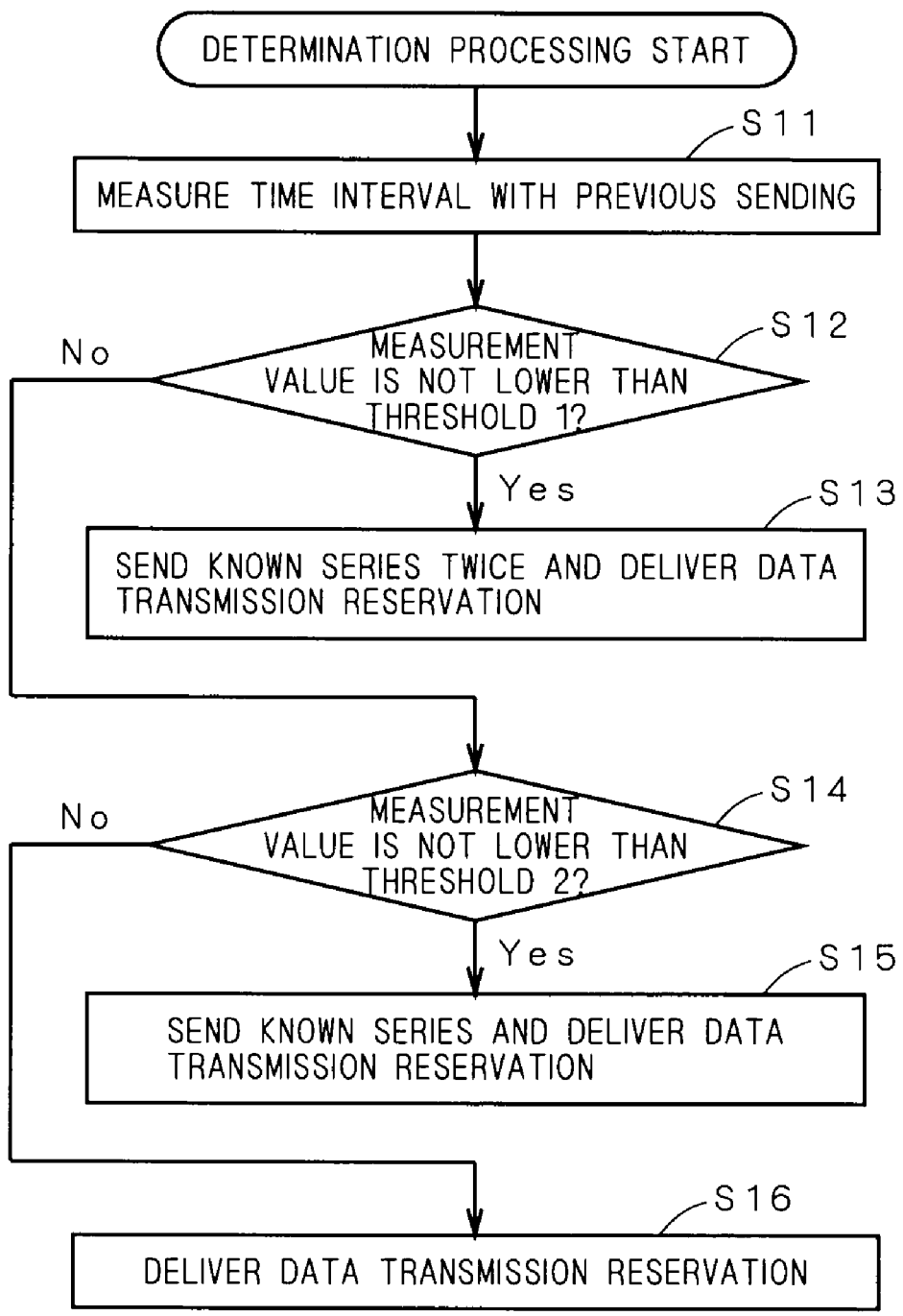
FIG. 24 is a flowchart explaining an example of determination processing.

That is, as shown in FIG. 24, when the sending-side device starts the determination processing, the sending time interval measuring unit 6011 measures the time interval from the last sending (step S11).

The sending data mapping unit 6014 determines whether or not the measurement value is not lower than a predetermined threshold 1 (step S12). When the measurement value is not lower than the threshold 1, the data transmission reservation 500 is delivered to the reception-side device in synchronization with the two-time sending of the known series (step S13).

In step S12, when the measurement value is lower than the threshold 1, it is determined whether or not the measurement value is not lower than a predetermined threshold 2 (step S14). When the measurement value is not lower than the threshold 2, the data transmission reservation 500 is delivered to the reception-side device in synchronization with the sending of the known series (step S15).

In step S14, when the measurement value is lower than the threshold 2, the data transmission reservation 500 is delivered to the reception-side device.

At this point, the threshold 1 is larger than the threshold 2. When the time interval from the last sending becomes larger, the reception-side device can establish the sufficient synchronization by sending the known series twice.

(C-5-2. Second Modification)

A second modification of the first operation example of the sending data amount determination unit 601 will be described below with reference to a flowchart of FIG. 25.

In the case where the reception-side device has a small wireless transmittable bandwidth, in order to perform the reception while the resource block is changed, it is necessary to change a frequency setting unit (synthesizer) of the reception-side device. In such cases, it is necessary that the resource block which receives the substantial data be identical to the resource block which receives the known series.

However, in the case where the reception-side device has the sufficiently wide wireless transmittable bandwidth, because only the preceding sub-carrier mapping of IFFT concentrates on a particular resource block, the change of the frequency setting unit is eliminated, and the resource block which receives the substantial data may be different from the resource block which receives the known series.

Figure 25:
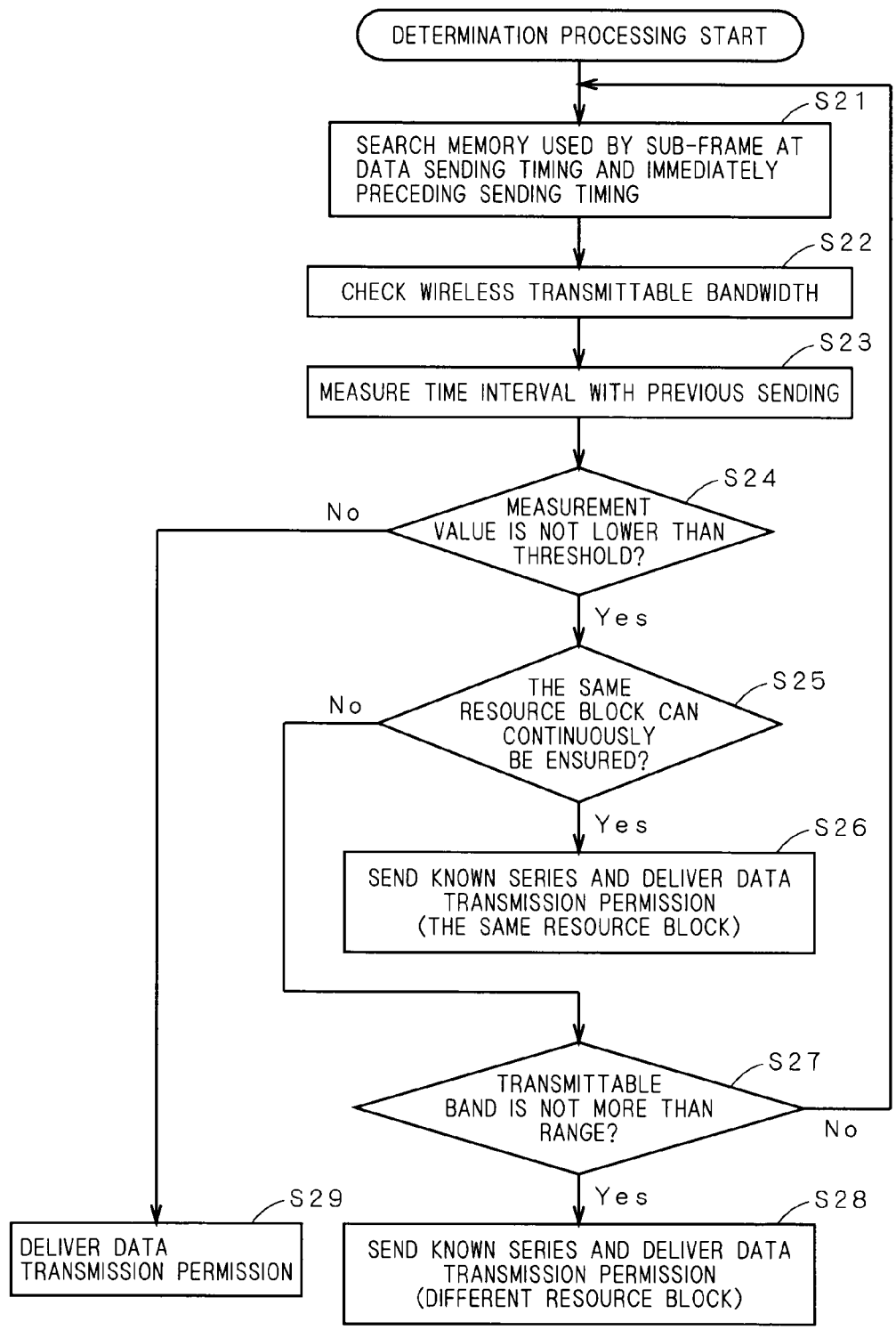
FIG. 25 is a flowchart explaining an example of determination processing.

In such cases, as shown in FIG. 25, the sending-side device searches a memory used by the sub-frame at the data sending timing and the immediately preceding sending timing to check an empty resource block (step S21).

Then, the sending-side device searches a memory in which information on sending-side device capability (communication capability) is stored to check the wireless transmittable bandwidth of the sending-side device (step S22).

Then, the sending time interval measuring unit 6011 measures the time interval from the last sending (step S23).

The sending data mapping unit 6014 determines whether or not the measurement value is not lower than a predetermined threshold (step S24). When the measurement value is not lower than the threshold, a determination whether or not the same resource blocks can continuously be ensured (that is, the substantial sending data and the known series can sent by the same resource blocks) is made by referring to the resource block empty information checked in step S21 (step S25).

When the same resource blocks can continuously be ensured, the data transmission reservation 500 is delivered to the reception-side device in synchronization with the sending of the known series (step S26). In this case, the sending-side device sends the known series and the substantial sending data with the same resource blocks.

In step S24, when the measurement value is smaller than the threshold, the data transmission reservation 500 is delivered to the reception-side device (step S29).

When the same resource blocks cannot continuously be ensured In step S25, a transmittable band of the sending-side device is compared to a range of the reception-side device, that is, an empty frequency during the data sending is compared to an empty frequency during the known-series sending in step S27. When the range of the reception-side device is not lower than the transmittable band of the sending-side device, the data transmission reservation 500 is delivered to the reception-side device in synchronization with the known-series sending (step S28). In this case, the sending-side device sends the known series and substantial sending data with the different resource blocks.

In step S27, when the range of the reception-side device is lower than the transmittable band of the sending-side device, the sending-side device waits for the next sending timing, and the pieces processing from step S21 are repeated when the next sending timing comes.

Assuming that the empty frequency during the data sending is a frequency corresponding to the first resource block and the empty frequency during the known-series sending is a frequency corresponding to the fourth resource block, the range in step S27 is a function which becomes a frequency width of the sum of the frequencies of the first resource block, second resource block, third resource block, and fourth resource block.

(C-6. A Second Operation Example of Sending Data Amount Determination Unit)

A second operation example of the sending data amount determination unit 601 will be described below with reference to FIGS. 26 and 27.

Figure 26:
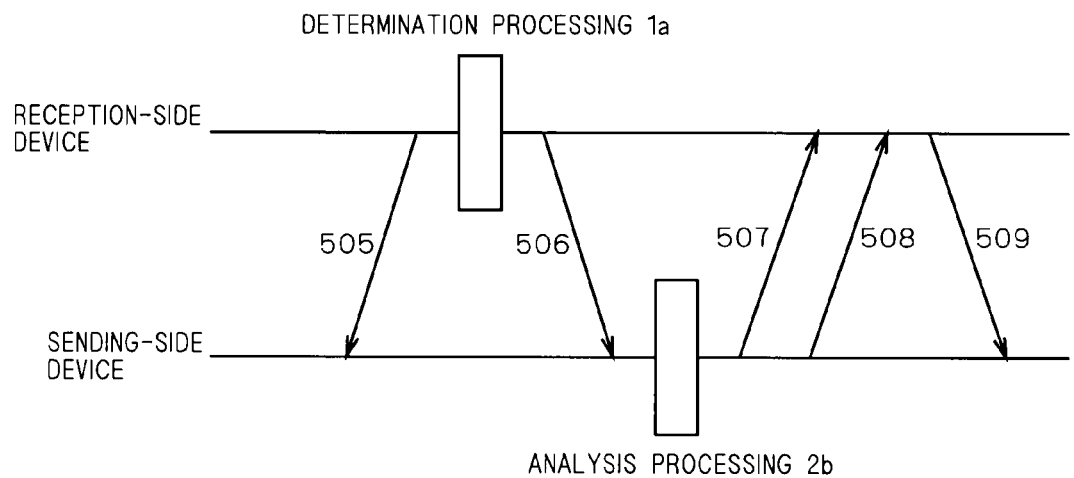
FIG. 26 is a view schematically showing determination processing and analysis processing for determining a message flow and message contents between a reception-side device and a sending-side device.

FIG. 26 is a view schematically showing the determination processing 1a and analysis processing 2b for determining a message flow and message contents between the reception-side device and the sending-side device.

The second operation example of FIG. 26 differs from the first operation example of FIG. 22 in that reception-side device performs the determination processing.

For example, in the case where the sending-side device sends data, the sending-side device sends a sending request message 505.

When the reception-side device receives the sending request message 505, the reception-side device performs determination processing 1a. The determination processing 1a is performed based on a reception history in the reception-side device, and the determination processing 1a is basically identical to the determination processing 1a of FIGS. 23 to 25 which is performed based on the sending history in the sending-side device.

As a result of the determination processing 1a, when the time interval from the last sending is not lower than a threshold, the reception-side device sends a known-series sending instruction and a data transmission reservation 506 to sending-side device. When the sending-side device cannot be uniquely defined by the sending frequency or sending timing because of the plurality of sending-side devices, the reception-side device also sends the identification information on the sending-side device.

When the sending-side device receives the data transmission reservation 506, the sending-side device analyzes the data transmission reservation 506 through analysis processing 2b, the sending-side device sends a known series 507 with a predetermined resource block number and sending timing, and the sending-side device also sends sending data 508.

On the other hand, when the reception-side device can receive the sending data 508, the reception-side device sends a normal reception completion signal 509.

In the case where the known series 507 is transmitted, the known series 507 or the sending electric power of the sending data 508 is effectively increased. When the time interval from the last sending becomes larger, the sending electric power is further increased effectively.

(C-7. Effect)

As described above, in the wireless communication device of the third embodiment, in the case where the sending is resumed after the sending is not performed for a while to the opposite wireless communication device, the reception-side device can perform the reception with stable reception characteristics by sending the known-series bit, the balance can be established between stable reception characteristics and the improvement of the transmission speed of the substantial sending data.

Although the present invention is described in detail above, the description is only by way of example in all the aspects, and the present invention is not limited to the embodiments. It is understood that various modifications can be made without departing from the scope of the present invention.

The invention claimed is:

1. A wireless communication device in which sending data and transmission control data are sent and received in resource blocks,
the wireless communication device comprising:
a transmission control data separation unit which receives said transmission control data and separates said transmission control data into resource dependent data dependent on a transmission resource and resource independent data not dependent on the transmission resource, said resource dependent data being provided for each resource block according to the number of resource blocks used in transmission of the transmission control data; and
a transmission control data mapping unit which
receives said resource dependent data and said resource independent data, and
performs mapping such that said resource independent data and said resource dependent data are included in each resource block, and
performs different scrambling processing to said resource independent data in each resource block.

2. The wireless communication device according to claim 1, wherein a scrambling code is multiplied to said resource independent data in said scrambling processing, said scrambling code decreasing a ratio of a peak electric power to an average electric power in sending said transmission control data.

3. The wireless communication device according to claim 1, wherein said transmission control data mapping unit maps said resource independent data and said resource dependent data such that part of one or a plurality of sub-frames of a plurality of sub-frames provided by time dividing each resource block are occupied.

4. The wireless communication device according to claim 1, wherein said transmission control data mapping unit maps said resource independent data and said resource dependent data across all sub-carriers of a plurality of sub-carriers provided by frequency-dividing said each resource block.

5. The wireless communication device according to claim 1, wherein said transmission control data mapping unit maps said resource independent data and said resource dependent data across some sub-carriers of a plurality of sub-carriers provided by frequency-dividing each resource block.

6. The wireless communication device according to claim 5, wherein said transmission control data mapping unit maps said resource independent data by further dividing timing in each sub-frame of each resource block.

7. The wireless communication device according to claim 1, further comprising
a transmission control data replication unit which has at least a function of receiving said resource independent data to replicate said resource independent data according to said number of resource blocks, wherein
said transmission control data mapping unit receives said resource dependent data and said resource independent data including a replica.

8. The wireless communication device according to claim 7, wherein said transmission control data replication unit produces dummy data including only data of "0" or data of "1", and
said transmission control data mapping unit maps said resource independent data in part of each resource block and maps said dummy data in which all bits corresponding to said resource independent data are fixed to "0" or "1", in a rest of each resource block.

9. The wireless communication device according to claim 1 further comprising:
an error correction unit which receives said resource dependent data and said resource independent data and performs error correction coding processing to said resource dependent data and said resource independent data to produce error-correction-coded resource dependent data and error-correction-coded resource independent data; and
a puncture unit which receives said error-correction-coded resource dependent data and said error-correction-coded resource independent data and performs puncture processing to an excess bit to produce punctured resource independent data, said excess bit exceeding a data amount sendable by each resource block in error-correction-coded resource independent data,
wherein said transmission control data mapping unit receives said error-correction-coded resource dependent data and said punctured resource independent data and performs mapping such that said error-correction-coded resource dependent data and said punctured resource independent data are included in each resource block.

10. A wireless communication method, implemented by a wireless communication device, in which sending data and transmission control data are sent and received in resource blocks, the wireless communication method comprising:
receiving, at a transmission control data separation unit, said transmission control data;
separating, at the transmission control data separation unit, said transmission control data into resource dependent data dependent on a transmission resource and resource independent data not dependent on the transmission resource, said resource dependent data being provided for each resource block according to the number of resource blocks used in transmission of the transmission control data;
receiving, at a transmission control data mapping unit, said resource dependent data and said resource independent data;
performing, at the transmission control data mapping unit, mapping such that said resource independent data and said resource dependent data are included in each resource block; and
performing, at the transmission control data mapping unit, different scrambling processing to said resource independent data in each resource block.

* * * * *